United States Patent
Arihara et al.

(10) Patent No.: US 10,686,196 B2
(45) Date of Patent: Jun. 16, 2020

(54) CATALYST PARTICLES, AND ELECTRODE CATALYST, ELECTROLYTE MEMBRANE-ELECTRODE ASSEMBLY, AND FUEL CELL USING CATALYST PARTICLES

(71) Applicant: NISSAN MOTOR CO., LTD., Yokohama-shi, Kanagawa (JP)

(72) Inventors: Kazuki Arihara, Kanagawa (JP); Hiroyuki Tanaka, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/755,330

(22) PCT Filed: Aug. 27, 2015

(86) PCT No.: PCT/JP2015/074309
§ 371 (c)(1),
(2) Date: Feb. 26, 2018

(87) PCT Pub. No.: WO2017/033342
PCT Pub. Date: Mar. 2, 2017

(65) Prior Publication Data
US 2018/0248200 A1 Aug. 30, 2018

(51) Int. Cl.
*H01M 4/92* (2006.01)
*H01M 8/1004* (2016.01)
(Continued)

(52) U.S. Cl.
CPC ............ *H01M 4/921* (2013.01); *B01J 23/89* (2013.01); *H01M 4/8657* (2013.01);
(Continued)

(58) Field of Classification Search
CPC .. H01M 4/921; H01M 4/8657; H01M 4/9083; H01M 8/1004
See application file for complete search history.

(56) References Cited

U.S. PATENT DOCUMENTS

2006/0027042 A1* 2/2006 Sato ..................... B01J 23/89
  75/255
2006/0093892 A1* 5/2006 Min ..................... B01J 23/56
  429/483
(Continued)

FOREIGN PATENT DOCUMENTS

DE  11 2010 005 334 T5  12/2012
EP       1 623 780 A1     2/2006
(Continued)

*Primary Examiner* — Miriam Stagg
*Assistant Examiner* — Brent C Thomas
(74) *Attorney, Agent, or Firm* — Foley & Lardner LLP

(57) ABSTRACT

To provide catalyst particles that can exhibit high activity. Catalyst particles, which are alloy particles formed from platinum atoms and non-platinum metal atoms, each alloy particle having a main body that constitutes a granular form; and a plurality of protrusions protruding outward from the outer surface of the main body, in which the main body is formed from a non-platinum metal and platinum, the protrusions are formed from platinum as a main component, and the aspect ratio (diameter/length) of the protrusions is higher than 0 and lower than or equal to 2.

12 Claims, 1 Drawing Sheet

(51) Int. Cl.
*H01M 4/86* (2006.01)
*H01M 4/90* (2006.01)
*B01J 23/89* (2006.01)
*H01M 8/1018* (2016.01)

(52) U.S. Cl.
CPC ....... *H01M 4/9041* (2013.01); *H01M 4/9083* (2013.01); *H01M 4/92* (2013.01); *H01M 8/1004* (2013.01); *H01M 2008/1095* (2013.01)

(56) References Cited

U.S. PATENT DOCUMENTS

| | | |
|---|---|---|
| 2011/0200915 A1 | 8/2011 | Goto et al. |
| 2011/0275009 A1 | 11/2011 | Goto et al. |
| 2012/0321996 A1 | 12/2012 | Ito |
| 2013/0324394 A1 | 12/2013 | Shao et al. |
| 2014/0154609 A1* | 6/2014 | Yoo ................. H01M 4/926 429/482 |
| 2016/0013494 A1 | 1/2016 | Arihara et al. |

FOREIGN PATENT DOCUMENTS

| | | |
|---|---|---|
| EP | 1 653 535 A1 | 5/2006 |
| JP | 2010-242179 A | 10/2010 |
| JP | 2011-26665 A | 2/2011 |
| JP | 2011-072981 A | 4/2011 |
| JP | 2014-508038 A | 4/2014 |
| WO | WO 2011/108162 A1 | 9/2011 |
| WO | WO 2014/129253 A1 | 8/2014 |

\* cited by examiner

CATALYST PARTICLES, AND ELECTRODE CATALYST, ELECTROLYTE MEMBRANE-ELECTRODE ASSEMBLY, AND FUEL CELL USING CATALYST PARTICLES

TECHNICAL FIELD

The present invention relates to catalyst particles, and an electrode catalyst, an electrolyte membrane-electrode assembly, and a fuel cell using the catalyst particles. More particularly, the present invention relates to catalyst particles that can exhibit high activity, and an electrode catalyst, an electrolyte membrane-electrode assembly, and a fuel cell using the catalyst particles.

BACKGROUND ART

In recent years, in response to social demands and movements arising from energy and environmental issues, fuel cells that can be operated even at normal temperature to obtain high power density are attracting attention as power sources for electric vehicles and as stationary power sources. Fuel cells are clean power generating systems having almost no adverse impact on the global environment because the product generated by an electrode reaction is water in principle. Particularly, polymer electrolyte fuel cells (PEFCs) are operated at relatively low temperature and are therefore anticipated to be used as power sources for electric vehicles. Polymer electrolyte fuel cells are generally configured to have a structure in which an electrolyte membrane-electrode assembly (MEA) is sandwiched between separators. An electrolyte membrane-electrode assembly is formed such that a polymer electrolyte membrane is interposed by a pair of an electrode catalyst layers and a pair of gas diffusion electrodes (gas diffusion layers; GDL).

In a polymer electrolyte fuel cell having an electrolyte membrane-electrode assembly such as described above, an electrode reaction represented by the reaction formula described below is caused to progress in the two electrodes (cathode and anode) that sandwich the solid polymer electrolyte membrane according to the polarities of the electrodes, and thus electric energy is obtained. First, hydrogen contained in the fuel gas supplied to the anode (negative electrode) side is oxidized by a catalyst component and produces protons and electrons ($2H_2 \rightarrow 4H^+ + 4e^-$: Reaction 1). Next, protons thus produced pass through the solid polymer electrolyte included in the electrode catalyst layer and the solid polymer electrolyte membrane that is in contact with the electrode catalyst layer, and reach the electrode catalyst layer on the cathode (positive electrode) side. Furthermore, electrons produced in the electrode catalyst layer on the anode side pass through an electroconductive carrier that constitutes the electrode catalyst layer, a gas diffusion layer that is in contact with a side of the electrode catalyst layer, the side being different from the solid polymer electrolyte membrane, a separator, and an external circuit, and reach the electrode catalyst layer on the cathode side. The protons and electrons that have reached the electrode catalyst layer on the cathode side react with oxygen contained in an oxidizing agent gas that is supplied to the cathode side, and produce water ($O_2 + 4H^+ + 4e^- \rightarrow 2H_2O$: Reaction 2). In a fuel cell, it is possible to extract electricity to the outside through the electrochemical reaction described above.

For the purpose of enhancing the power generation performance, for example, metal nanoparticles having a konpeito shape in which dendritic parts extend radially from the central part are reported in Patent Literature 1. According to Patent Literature 1, it is described that since the specific surface area of the metal nanoparticles can increase while the metal nanoparticles have a thermally stable particle size, the catalytic function can be enhanced.

CITATION LIST

Patent Literatures

Patent Literature 1: JP 2011-26665 A

SUMMARY OF INVENTION

Technical Problem

However, the metal nanoparticles described in Patent Literature 1 still require a large amount of a metal (particularly, platinum) that is needed in order to achieve desired activity. Therefore, it cannot be said that the metal nanoparticles described in Patent Literature 1 have sufficient activity that is required as a catalyst.

Therefore, the present invention was achieved in view of such circumstances, and it is an object of the present invention to provide catalyst particles that can exhibit high activity.

Solution to Problem

The inventors of the present invention conducted a thorough study in order to solve the problems described above. As a result, the inventors found that in regard to a catalyst particle having a konpeito shape, when protrusions that mainly contribute to the reaction are substantially formed from platinum with high activity, the problems described above can be solved, thus completing the present invention.

DESCRIPTION OF EMBODIMENTS

Figure 1:
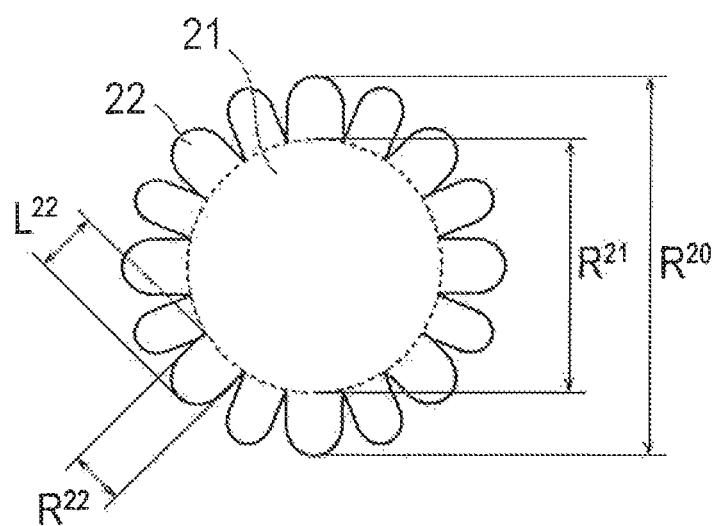
FIG. 1 is a cross-sectional view schematically illustrating a catalyst particle according to an embodiment of the present invention.

A catalyst particle of the present invention is an alloy particle formed from platinum atoms and non-platinum metal atoms, and the alloy particle has a main body that constitutes a granular form; and a plurality of protrusions protruding outward from the outer surface of the main body. Here, the main body is formed from a non-platinum metal and platinum, the protrusions are formed from platinum as a main component, and the aspect ratio (diameter/length) of the protrusions is higher than 0 and lower than or equal to 2. When the above-described configuration is employed, the activity of the catalyst can be enhanced.

According to the present specification, the "main body that constitutes a granular form" is also referred to as "main body according to the present invention" or simply as "main body". Similarly, the "plurality of protrusions protruding outward from the outer surface of the main body" is also referred to as "protrusions according to the present invention" or simply as "protrusions".

Conventionally, particulate catalysts (particularly, platinum particles) have been used for the catalyst layer for a fuel cell. However, since the specific surface area is small in such a simple spherical structure, there has been a problem that the activity is poor (area specific activity or mass specific activity). Meanwhile, since the metal nanoparticles of Patent Literature 1 have a konpeito shape, the specific surface area can be increased compared to a simple spherical structure. For this reason, a catalyst obtained by supporting such metal nanoparticles on a carrier can have enhanced activity, in particular, enhanced mass specific activity, compared to metal particles having a simple spherical structure with the same composition. In the Examples of Patent Literature 1, metal nanoparticles having a konpeito shape are formed from platinum. However, in such metal nanoparticles having a konpeito shape, the central part of the granular form is hardly brought into contact with a reactant gas, and therefore, the contribution of the central part to the reaction is low. Here, platinum has very high catalytic activity and is usually used as a catalytic component of an electrode catalyst; however, platinum is a metal that is very expensive and is a rare resource. Therefore, it is necessary to increase the utilization ratio of platinum as far as possible; however, even if the metal nanoparticles described in Patent Literature 1 are employed, it cannot be confidently said that platinum is effectively utilized, and it cannot be said the activity, particularly the mass specific activity, is sufficient. Furthermore, according to Patent Literature 1, it is described that metal nanoparticles formed from alloys of platinum with other metals can also be produced (paragraph [0026]). However, although this method is employed, since platinum is used in the central part that contributes less to the reaction, it cannot be confidently said that platinum is effectively utilized, and it cannot be said that the activity, particularly the mass specific activity, is sufficient. Therefore, it has been desired to develop catalytic particles that have their activity (area specific activity and mass specific activity) enhanced by increasing the effective utilization ratio of platinum.

In this regard, the catalyst particles of the present invention are characterized by the following:

(a) the catalyst particles are alloy particles formed from platinum atoms and non-platinum metal atoms;

(b) an alloy particle has a main body that constitutes a granular form, and a plurality of protrusions protruding outward from the outer surface of the main body;

(c) the main body is formed from a non-platinum metal and platinum, while the protrusions are formed from platinum as a main component; and (d) the aspect ratio (diameter/length) of the protrusions is higher than 0 and lower than or equal to 2.

According to the configurations (a), (b), and (c) described above, a catalyst (alloy) particle according to the present invention is configured to include a main body formed from a non-platinum metal and platinum; and protrusions substantially formed from platinum. According to the configurations (b) and (c), the main body having a low ratio of contribution to the reaction is configured to include a non-platinum metal having relatively low catalytic activity, in addition to platinum, while the protrusions that are brought into contact with the reactant gas and have a high ratio of contribution to the reaction are configured to mainly include platinum having high catalytic activity. Therefore, compared to those catalyst particles formed from platinum or the metal particles described in Patent Literature 1, the utilization ratio of platinum can be increased, and the amount of platinum required to achieve the same activity can be reduced. Furthermore, by employing the configurations described above, crystal faces exhibiting high activity can be exposed to a large extent. Also, by producing the catalyst particles so as to have a konpeito-shaped structure, compressive stress comes into action, and thereby the distance between platinum atoms is shortened. Therefore, the activity (mass specific activity and area specific activity), particularly the area specific activity, can be enhanced. That is, a platinum alloy-based catalyst having enhanced activity as an electrode catalyst and having a reduced platinum content in the catalyst particles, can be provided. According to the configuration (d), since the roughness of the catalyst particle surface increases, the area that can effectively contribute to the reaction increases. Therefore, the activity, particularly the area specific activity, can be enhanced. Furthermore, since the specific surface area of the catalyst particles increases, the activity, particularly the mass specific activity, can also be enhanced.

Therefore, the catalyst particles of the present invention can exhibit high activity (mass specific activity and area specific activity), even with a small platinum content. For this reason, an electrode catalyst using the catalyst particles of the present invention, and a membrane-electrode assembly and a fuel cell, both of which have the electrode catalyst in the catalyst layer, exhibit excellent power generation performance.

Catalyst (alloy) particles adopting the structure described above are such that due to the structure, platinum mainly exists on the surface of the catalyst particles (platinum is exposed). For this reason, the catalyst particles have high elution resistance, and can suppress and prevent successive elution of the non-platinum metal even under acidic conditions, for example, even in a state of being in contact with a strongly acidic electrolyte. Therefore, the catalyst particles of the present invention can exhibit the effects induced by the non-platinum metal atoms over a long time period.

Therefore, the catalyst particles of the present invention have excellent durability and can maintain high activity (mass specific activity and area specific activity) for a long time period. For this reason, an electrode catalyst using the catalyst particles of the present invention, and a membrane-electrode assembly and a fuel cell, both of which have the electrode catalyst in the catalyst layer, have excellent durability.

The present invention is not intended to be limited by the mechanism described above.

Hereinafter, embodiments of the present invention will be explained. The present invention is not intended to be limited to the following embodiments. Furthermore, the dimensional ratios of the drawings are exaggerated for the convenience of explanation and may be different from the actual ratios.

In the following description, embodiments of the catalyst particles of the present invention, and embodiments of an electrode, an electrolyte membrane-electrode assembly (MEA), and a fuel cell, all of which use these catalyst particles, will be explained in detail with reference to the drawings as appropriate. However, the present invention is not limited only to the following embodiments. Meanwhile, the various drawings are expressed exaggeratedly for the convenience of explanation, and the dimensional ratios of the various constituent elements in the various drawings may be different from the actual dimensional ratios. Furthermore, when the embodiments of the present invention are explained with reference to the drawings, the same reference symbols will be assigned to the same elements in the explanation of the drawings, and any overlapping descriptions will not be repeated.

According to the present specification, the description "X to Y" representing a range means "more than or equal to X and less than or equal to Y", including X and Y. Unless particularly stated otherwise, operation and measurement of physical properties and the like are carried out under the conditions of room temperature (20° C. to 25° C.)/relative humidity of 40% to 50%.

[Catalyst Particles]

The catalyst particles of the present invention have the following configurations:

(a) the catalyst particles are alloy particles comprising platinum atoms and non-platinum metal atoms;

(b) an alloy particle has a main body that constitutes a granular form, and a plurality of protrusions protruding outward from the outer surface of the main body;

(c) the main body is formed from a non-platinum metal and platinum, while the protrusions are formed from platinum as a main component; and (d) the aspect ratio (diameter/length) of the protrusions is higher than 0 and lower than or equal to 2.

FIG. 1 is a cross-sectional view schematically illustrating the catalyst particles according to an embodiment of the present invention. As illustrated in FIG. 1, a catalyst particle 20 according to the present invention has a main body 21 and a plurality of protrusions 22, and is preferably composed of a main body 21 and a plurality of protrusions 22. The main body 21 has a granular (spherical) structure (configuration (b)). The main body 21 is formed from a non-platinum metal and platinum (configuration (c)). Here, the main body 21 may have any structure such as that the entirety of the main body has a substantially uniform composition, or the main body is composed of parts having different compositions, as long as the main body is formed from a non-platinum metal and platinum. Preferably, the main body has at least a part formed from a non-platinum metal as a main component. Thereby, the utilization ratio of platinum can be further increased, and the amount of platinum required in order to achieve the same activity can be further reduced. According to an embodiment of the present invention, the central portion of the main body is formed from a non-platinum metal. Therefore, according to a preferred embodiment of the present invention, the main body has a central part (core part) formed from a non-platinum metal as a main component. Furthermore, in the above-described embodiment, the surface layer of the main body that is in contact with the protrusions may be in a solid-solution state in which the non-platinum metal and platinum are uniformly intermingled. For this reason, according to a more preferred embodiment of the present invention, the main body is configured to have a central part (core part) formed from a non-platinum metal as a main component, and an outer shell part (shell part) that covers the central part (core part) and is formed from a non-platinum metal and platinum. By adopting this configuration, the center of the main body is substantially formed from a non-platinum metal that is easily eluted, and on the catalyst particle surface, platinum that is not easily eluted exists more selectively (a larger amount of platinum is exposed). For this reason, the catalyst particles have further enhanced elution resistance, and even under acidic conditions, for example, even in a state of being in contact with a strongly acidic electrolyte, successive elution of the non-platinum metal can be suppressed and prevented more effectively (durability can be further enhanced). Here, when it is said that "the main body or the central part (core part) is formed from a non-platinum metal as a main component", it is implied that the main body or the central part (core part) is formed from a non-platinum metal at a proportion of more than 50 mol % (upper limit: 100 mol %) with respect to the total molar amount. Furthermore, it is preferable that the main body is formed from a non-platinum metal at a proportion of 60 mol % or more (upper limit: 100 mol %) with respect to the total molar amount of the main body. The proportion occupied by the non-platinum metal in the main body can be checked by means of the composition distribution of various particles obtained by TEM-EDX or the like. According to the more preferred embodiment described above, the composition of the outer shell part (shell part) is not particularly limited and can be appropriately adjusted depending on the production conditions for the catalyst particles (for example, the amount of addition of the non-platinum metal or platinum).

The protrusions 22 protrude outward from the outer surface of the main body 21 (configuration (b)). Furthermore, the protrusions 22 are formed from platinum as a main component (configuration (c)). Here, when it is said "the protrusions are formed from platinum as a main component", it is implied that the protrusions are formed from platinum at a proportion of more than 50 mol % (upper limit: 100 mol %) with respect to the total molar amount of the protrusions. Furthermore, it is preferable that the protrusions are formed from platinum at a proportion of 60 mol % or more (upper limit: 100 mol %) with respect to the total molar amount of the protrusions. The proportion occupied by platinum in the protrusions can be checked by means of the composition distribution in various particles obtainable by TEM-EDX or the like.

In regard to the protrusions 22, the aspect ratio (diameter/length) of the protrusions is higher than 0 and lower than or equal to 2 (configuration (d)). Since the roughness of the catalyst particle surface increases due to such a configuration, the area that can effectively contribute to the reaction, that is, the specific surface area of the catalyst particles, is increased. For this reason, the activity, particularly the mass specific activity, can be enhanced. Furthermore, due to such a configuration, crystal faces exhibiting high activity can be exposed to a large extent. Furthermore, when the catalyst particles are produced to have a konpeito-shaped structure, the compressive stress comes into action, and thereby the distance between platinum atoms is shortened. For this reason, the activity, particularly the area specific activity, can be enhanced. In contrast, in a case in which the aspect ratio of the protrusions is higher than 2, the shape of the catalyst particles becomes close to a spherical shape, and the effect by which the specific surface area can be enlarged is reduced. Furthermore, the exposure of the crystal faces exhibiting high activity is reduced, and since it becomes difficult for the compressive stress to act, the distance between platinum atoms is not easily shortened, which is not preferable. When the increase in the specific surface area, the exposure of crystal faces exhibiting high activity, shortening of the distance between platinum atoms caused by compressive stress, and the like are taken into consideration, the aspect ratio of the protrusions is preferably 0.1 to 2, and more preferably 0.2 to 2. Meanwhile, there is a plurality of protrusions; however, it is not necessary that all of these satisfy the aspect ratio described above. However, out of the total number of protrusions, preferably 60% or more, more preferably 80% or more, and particularly preferably all (100%) of the protrusions satisfy the aspect ratio.

The size of the protrusions is not particularly limited as long as the aspect ratio is included in the range according to the present invention. When the increase in the specific surface area, the exposure of crystal faces exhibiting high activity, shortening of the distance between platinum atoms caused by compressive stress, and the like are taken into consideration, the diameter of the protrusion is preferably more than 0 nm and less than or equal to 5 nm, more preferably more than 0 nm and less than or equal to 4 nm, and particularly preferably 1.5 to 4 nm. Furthermore, when the increase in the specific surface area, the exposure of crystal faces exhibiting high activity, shortening of the distance between platinum atoms caused by compressive stress, and the like are taken into consideration, the length of the protrusion is more than 0 nm and less than or equal to 10 nm, and more preferably 2 to 8 nm. There is a plurality of protrusions; however, it is not necessary that all of these satisfy the size described above (diameter or length of the protrusion). However, out of the total number of protrusions, preferably 60% or more, more preferably 80% or more, and particularly preferably all (100%) satisfy the size described above (diameter or length of the protrusion).

The size of the main body is not particularly limited as long as the aspect ratio is included in the range according to the present invention. The diameter of the main body is preferably 3 to 40 nm, and more preferably 5 to 30 nm.

Here, the aspect ratio of a protrusion is the ratio obtained by dividing the diameter of the protrusion by the length of the protrusion (=diameter of protrusion/length of protrusion), and is defined and determined as follows. That is, as described above, a catalyst particle is composed of the main body and protrusions; however, at this time, the main body and a protrusion are defined in relation to the boundary between the main body 21 and the protrusion 22 (dotted line in FIG. 1). That is, the main body is intended to mean the region on the central part side with respect to the boundary (interior of the dotted line in FIG. 1), and the protrusion is intended to mean the region facing outward with respect to the boundary (part on the outer side of the dotted line in FIG. 1). At this time, the "boundary between the main body 21 and the protrusion 22 (dotted line in FIG. 1)" is defined as an approximate circle determined based on the line connecting the bottoms between adjoining protrusions. Here, the approximate circle can be determined by the least squares method from the coordinates of measurement points. The length of a protrusion is the length of a perpendicular line drawn from the apex of the protrusion to the approximate circle ("$L^{22}$" in FIG. 1). The diameter of a protrusion is the maximum diameter of the protrusion ("$R^{22}$" in FIG. 1). Furthermore, the diameter of the main body is the maximum of the approximate circle ("$R^{21}$" in FIG. 1). The diameter ("$R^{22}$" in FIG. 1) and length ("$L^{22}$" in FIG. 1) of the protrusion and the diameter of the main body ("$R^{21}$" in FIG. 1) can be respectively measured by known methods; however, in the present specification, those values measured by transmission electron microscopy (TEM) are employed.

The size of the catalyst (alloy) particle is not particularly limited, and the size is preferably a size that satisfies the size requirement for the main body or the protrusion. Specifically, the diameter of the catalyst (alloy) particle is preferably more than 0 nm and less than or equal to 100 nm, more preferably more than 6 nm and less than or equal to 60 nm, and particularly preferably 10 to 50 nm. When the catalyst particle has such a size, the catalyst (alloy) particles can exhibit superior activity (mass specific activity and area specific activity). In a case in which the sizes of a catalyst (alloy) particle are not uniform, the diameter of the catalyst (alloy) particle is defined as the maximum diameter of the catalyst (alloy) particle ("$R^{20}$" in FIG. 1).

Furthermore, the catalyst particles are alloy particles including platinum atoms and non-platinum metal atoms (configuration (a)). In regard to the alloy particle according to the present invention, it is not intended that the entire particle is constructed from an alloy including platinum atoms and non-platinum metal atoms, but it is intended that at least a portion of the particle is constructed from an alloy including platinum atoms and non-platinum metal atoms. According to a preferred embodiment, in the catalyst particles, the main body is formed from a non-platinum metal as a main component, the protrusions are formed from platinum as a main component, and the vicinity of the boundaries between the main body and the protrusions is formed from an alloy of platinum atoms and non-platinum metal atoms as a main component. According to the present specification, the term "alloy" is a generic name for substances that are generally obtained by adding one or more kinds of metal elements or non-metal elements to a metal element and have metallic characteristics. In regard to the catalyst particles of the present invention, examples of the texture of the alloy include a eutectic alloy, which is a so-called mixture of crystals individually formed by each component element; a texture in which the component elements are completely dissolved and form a solid solution; and a texture in which the component elements form an intermetallic compound or a compound between a metal and a non-metal. According to the present invention, the catalyst particles may be in any form; however, a structure in which at least platinum atoms and non-platinum atoms form an intermetallic compound is included.

The non-platinum metal atoms are not particularly limited; however, from the viewpoints of the catalytic activity, the ease of forming the structure according to the present invention (particularly, the main body or the protrusions), and the like, the non-platinum metal atoms are preferably transition metal atoms. Here, the term transition metal atom refers to elements including from the elements of Group 3 to the elements of Group 12, and the type of the transition metal atoms is also not particularly limited. From the viewpoints of the catalytic activity, the ease of forming protrusions, and the like, it is preferable that the transition metal atoms are selected from the group consisting of vanadium (V), chromium (Cr), manganese (Mn), iron (Fe), cobalt (Co), nickel (Ni), copper (Cu), and zinc (Zn). It is more preferable that the transition metal atoms are atoms of nickel (Ni) or cobalt (Co). Since the transition metal atoms can easily form an intermetallic compound with platinum (Pt), the transition metal atoms can further enhance the activity (mass specific activity and area specific activity) while reducing the amount of use of platinum. Meanwhile, the transition metal atoms may be such that a single transition metal is alloyed with platinum, or two or more kinds of transition metals are alloyed with platinum; however, it is preferable that a single transition metal is alloyed with platinum.

The composition of the catalyst particles is also not particularly limited. From the viewpoints of the catalytic activity, the ease of forming protrusions, and the like, the composition of the catalyst particles is preferably such that the amount of the non-platinum metal atoms is 0.1 to 1 mol, more preferably 0.1 to 0.5 mol, and particularly preferably 0.15 to 0.3 mol, with respect to 1 mol of platinum atoms. When such a composition is employed, the catalyst particles can exhibit and maintain high activity. The composition of the catalyst particles (contents of the various metal atoms in the catalyst particles) can be determined by conventionally known methods such as inductively coupled plasma emission analysis (ICP atomic emission spectrometry), inductively coupled plasma mass analysis (ICP mass spectrometry), and X-ray fluorescence analysis (XRF).

[Method for Producing Catalyst Particles]

The method for producing the catalyst particles is not particularly limited as long as it is a method capable of producing catalyst particles having the following configurations (a) to (d):

(a) the catalyst particles are alloy particles including platinum atoms and non-platinum metal atoms;

(b) an alloy particle has a main body that constitutes a granular form, and a plurality of protrusions protruding outward from the outer surface of the main body;

(c) the main body is formed from a non-platinum metal and platinum, while the protrusions are formed from platinum as a main component; and (d) the aspect ratio (diameter/length) of the protrusions is higher than 0 and lower than or equal to 2.

According to a preferred embodiment, the catalyst particles according to the present invention can be produced by:

preparing a non-platinum metal precursor solution including a non-platinum metal precursor (Step (1));

preparing a reducing agent mixed liquid including an adsorbent and a reducing agent (Step (2));

mixing the non-platinum metal precursor solution with the reducing agent mixed liquid, reducing the non-platinum metal precursor, and thereby obtaining a non-platinum metal particle dispersion liquid (Step (3));

preparing a platinum precursor solution including a platinum precursor (Step (4)); and mixing the non-platinum metal particle dispersion liquid with the platinum precursor solution, reducing the platinum precursor, and thereby growing platinum on the surface of the non-platinum metal particles to form protrusions (Step (5)).

Hereinafter, the various steps of the production method of the embodiment mentioned above will be described in detail. However, the present invention is not intended to be limited to the following method.

(Step (1))

In the present step, a non-platinum metal precursor solution including a non-platinum metal precursor is prepared.

Here, the non-platinum metal that constitutes the non-platinum metal precursor is not particularly limited; however, since the non-platinum metal is similar to those described for the non-platinum metal atoms, further explanation will not be repeated here. The form of the non-platinum metal precursor is not particularly limited; however, a non-platinum metal salt and a non-platinum metal complex can be preferably used. More specifically, inorganic salts such as nitric acid salts, sulfuric acid salts, ammonium salts, amine salts, carbonic acid salts, bicarbonic acid salts, halides such as bromides and chlorides, nitrous acid salts, and oxalic acid salts; sulfamic acid salts, carboxylic acid salts such as formates, hydroxides, alkoxides, oxides, amine complexes, cyano complexes, halogeno complexes, and hydroxy complexes of non-platinum metals, and the like can be used. That is, a preferred example may be a compound in which the non-platinum metal can become a metal ion in a solvent such as pure water. Among these, more preferred examples of the salt of non-platinum metals include halides (particularly, chlorides), sulfuric acid salts, nitric acid salts, and sulfamic acid salts; and sulfuric acid salts and sulfamic acid salts are particularly preferred. The non-platinum metal precursors described above may be used singly or as mixtures of two or more kinds thereof. Furthermore, the non-platinum metal precursor may also be in the form of hydrate.

There are no particular limitations on the solvent that is used for the preparation of the non-platinum metal precursor solution, and the solvent is selected as appropriate according to the type of the non-platinum metal precursor used. The form of the non-platinum metal precursor solution is not particularly limited, and examples include a solution, a dispersion liquid, and a suspension liquid. From the viewpoint that uniform mixing is enabled, it is preferable that the non-platinum metal precursor solution is in the form of solution. Specific examples include water; organic solvents such as methanol, ethanol, 1-propanol, and 2-propanol; acids, and alkalis. Among these, from the viewpoint of sufficiently dissolving an ionic compound of the non-platinum metal, water is preferred, and it is particularly preferable to use pure water or ultrapure water. The solvents mentioned above may be used singly, or may be used in the form of a mixture of two or more kinds thereof.

The concentration of the non-platinum metal precursor in the non-platinum metal precursor solution is not particularly limited; however, the concentration is preferably, in terms of the metal, 0.01 M (mol/L) or more, more preferably 0.02 M (mol/L) or more, and particularly preferably 0.03 M (mol/L) or more. Furthermore, the upper limit of the concentration of the non-platinum metal precursor in the non-platinum metal precursor solution is also not particularly limited; however, the upper limit is preferably, in terms of the metal, 0.10 M (mol/L) or less, more preferably 0.09 M (mol/L) or less, and particularly preferably 0.08 M (mol/L) or less. When the concentration such as described above is used, the size of the main body can be more efficiently controlled to the range such as described above.

(Step (2))

In the present step, a reducing agent mixed liquid including an adsorbent and a reducing agent is prepared. Here, an adsorbent refers to a compound, which when a non-platinum metal precursor is reduced to become non-platinum metal particles in Step (3) that will be described below, adsorbs to the surface of the non-platinum metal particles and inhibits a substitution reaction with platinum ions in Step (5) that will be described below. The adsorbent also acts so as to prevent aggregation. A reducing agent is a compound capable of reducing a non-platinum metal precursor (suitably, transition metal precursor) and a platinum precursor.

The adsorbent that can be used in the present step is not particularly limited; however, examples include citrates such as sodium citrate and trisodium citrate; citrate hydrates such as trisodium citrate dihydrate; citric acid; water-soluble polymers such as polyvinylpyrrolidone, polyethyleneimine, chitosan, sodium polyacrylate, and a polyacrylic acid ester; sulfur compounds such as decanethiol and hexanethiol; and aliphatic quaternary amine salts such as cetyltrimethylammonium bromide and cetyltrimethylammonium chloride. Among these, the adsorbent is preferably a citric acid salt or a hydrate thereof, and more preferably trisodium citrate dihydrate. These adsorbents more selectively and more uniformly adsorb to the surface of the non-platinum metal particles when the non-platinum metal precursor is reduced to become non-platinum metal particles, and more effectively inhibit a substitution reaction with platinum ions in Step (5) that will be described below. Therefore, the protrusions can be formed more selectively and more uniformly on the surface of the non-platinum metal particles in Step (5) that will be described below. Furthermore, the adsorbent has an excellent aggregation preventing effect and also acts as a buffering agent so that the pH change at the time of reaction can be reduced to a minimal level. Thus, the adsorbent can facilitate the reaction to proceed uniformly.

Meanwhile, the adsorbents described above may be used singly or as mixtures of two or more kinds thereof.

The reducing agent that can be used in the present step is not particularly limited; however, it is preferable that the reducing agent is a reducing agent exhibiting a reducing action at 30° C. or lower, and more preferably 20° C. or lower. Examples of such a reducing agent that can be used include borohydride compounds such as sodium borohydride ($NaBH_4$), calcium borohydride ($Ca(BH_4)_2$), lithium borohydride ($LiBH_4$), aluminum borohydride ($Al(BH_4)_3$), and magnesium borohydride ($Mg(BH_4)_2$); lower alcohols such as ethanol, methanol, and propanol; formic acid salts such as formic acid, sodium formate, and potassium formate; sodium thiosulfate, and hydrazine ($N_2H_4$). These may also be in the form of hydrates. The reducing agents described above may be used singly, or may be used as mixtures of two or more kinds thereof. Meanwhile, citric acid salts, for example, trisodium citrate dihydrate, are reducing agents for platinum; however, since these compounds are not able to reduce transition metal atoms, citric acid salts are not included in the reducing agent according to the present invention. Among them, from the viewpoint of reducing action, it is preferable to use a borohydride compound as the reducing agent, and it is more preferable to use sodium borohydride. Particularly, in the case of using a citric acid salt or a hydrate thereof as the adsorbent, it is preferable to use a borohydride compound because the aqueous solution becomes weakly alkaline, and this weak alkalinity can accomplish the role of extending the lifetime of the reducing ability of the borohydride compound.

The solvent used for the preparation of the mixed liquid including a reducing agent and an adsorbent is not particularly limited, and the solvent is selected as appropriate according to the types of the reducing agent and the adsorbent used therein. The form of the mixed liquid is not particularly limited, and examples include a solution, a dispersion liquid, and a suspension liquid. From the viewpoint that uniform mixing is enabled, it is preferable that the mixed liquid is in the form of a solution. When the reducing agent is added to the non-platinum metal precursor solution while the reducing agent is in a solution state, it is preferable because the reaction rate in the mixed solution becomes uniform even compared to the case of adding a reducing agent in a powdered form, and the particle size becomes uniform. Similarly, when the adsorbent is added to the non-platinum metal precursor solution while the adsorbent is in a solution state, it is preferable because the reaction rate in the mixed solution becomes uniform even compared to the case of adding a reducing agent in a powdered form, and the adsorbent can adsorb more selectively and more uniformly to the non-platinum metal particle surface.

Specific examples of the solvent include water; organic solvents such as methanol, ethanol, 1-propanol, and 2-propanol; acids; and alkalis. Among these, from the viewpoint of sufficiently dissolving the reducing agent and the adsorbent, water is preferred, and it is particularly preferable to use pure water or ultrapure water. The solvents described above may be used singly, or may be used in the form of a mixture of two or more kinds thereof. The concentration of the adsorbent or the reducing agent in the reducing agent mixed liquid is not particularly limited, and the concentration may be determined as appropriate such that the adsorbent and the reducing agent are added in the preferred amounts described in Step (3) that will be described below. For example, the concentration of the adsorbent in the reducing agent mixed liquid is preferably 0.1 to 5 g/100 mL of the solvent, and more preferably 0.2 to 3 g/100 mL of the solvent. Furthermore, the concentration of the reducing agent in the reducing agent mixed liquid is preferably 0.3 to 10 g/100 mL of the solvent, and more preferably 0.5 to 5 g/100 mL of the solvent.

The method for preparing the reducing agent mixed liquid including the reducing agent and the adsorbent is not particularly limited. For example, any of a method of adding an adsorbent to a solvent and then adding a reducing agent thereto; a method of adding a reducing agent to a solvent, and then adding an adsorbent thereto; a method of separately dissolving an adsorbent and a reducing agent respectively in a solvent, and then mixing these solutions; and a method of adding an adsorbent and a reducing agent all together to a solvent, may be used.

The mixed liquid may be stirred for the purpose of uniformly mixing the liquid. Here, the stirring conditions are not particularly limited as long as the stirring conditions are, in particular, conditions capable of uniformly mixing the liquids. For example, an appropriate stirring machine such as a stirrer or a homogenizer is used. Alternatively, the mixed liquid can be uniformly dispersed and mixed by applying ultrasonic waves by means of an ultrasonic dispersing apparatus. Furthermore, the stirring time may be set as appropriate so that dispersion is carried out sufficiently, and the stirring time is usually 0.5 to 60 minutes, and preferably 1 to 40 minutes.

(Step (3))

In the present step, the non-platinum metal precursor solution prepared in Step (1) described above is mixed with the reducing agent mixed liquid prepared in Step (2) described above, the non-platinum metal precursor is reduced, and thereby a non-platinum metal particle dispersion liquid is obtained.

Here, the method of mixing the reducing agent mixed liquid with the non-platinum metal precursor solution (method for preparing a mixed liquid of a reducing agent mixed liquid and a non-platinum metal precursor solution) is not particularly limited. For example, the reducing agent mixed liquid may be added to the non-platinum metal precursor solution, the non-platinum metal precursor solution may be added to the reducing agent mixed liquid, or the non-platinum metal precursor solution and the reducing agent mixed liquid may be added altogether. From the viewpoint that it is easy to control the reduction/adsorption conditions (for example, the reduction rate, and the adsorption state of the adsorbent to the non-platinum metal particle surface), it is preferable to add the reducing agent mixed liquid to the non-platinum metal precursor solution. The method of adding is also not particularly limited. For example, the reducing agent mixed liquid may be added to the non-platinum metal precursor solution all at once or in divided portions. Similarly, the non-platinum metal precursor solution may be added to the reducing agent mixed liquid all at once or in divided portions.

Furthermore, the mixing ratio between the reducing agent mixed liquid and the non-platinum metal precursor solution is not particularly limited and is selected as appropriate according to the desired effects.

For example, the amount of addition of the adsorbent to the reducing agent mixed liquid is set as appropriate in consideration of the ease of control of the adsorption state of the adsorbent to the non-platinum metal particles (consequently, the ease of forming protrusions in the subsequent processes), the effect of preventing aggregation, and the like. For example, the amount of addition of the adsorbent in the reducing agent mixed liquid is preferably 2.3 mol or more, and more preferably 2.4 mol or more, with respect to 1 mol of the non-platinum metal precursor (in terms of the metal).

The upper limit of the amount of addition of the adsorbent in the reducing agent mixed liquid is not particularly limited; however, the upper limit is preferably 10 mol or less, and more preferably 8 mol or less, with respect to 1 mol of the non-platinum metal precursor (in terms of the metal). As such, when the adsorbent is used in a relatively large amount with respect to the non-platinum metal, the protrusions of platinum can be formed more efficiently on the surface of the non-platinum metal particle (main body), by the following mechanism. The mechanism such as described below is just a presumption, and the present invention is not intended to be limited by the following presumption. That is, when the non-platinum metal particle dispersion liquid and the platinum precursor solution are mixed in Step (5) that will be described below, the platinum precursor in an ionic form in the platinum precursor solution induces ionization of the metal that constitutes the non-platinum metal particles, the platinum precursor itself is reduced to become platinum, and the non-platinum metal that constitutes the non-platinum metal particles is substituted with platinum. As a result of the substitution reaction, platinum is precipitated on the surface of the non-platinum metal particles. On the other hand, since the non-platinum metal particle portion on which the adsorbent exists (has adsorbed) is not brought into contact with platinum ions, the adsorbent inhibits ionization of the non-platinum metal. For this reason, at the surface of the non-platinum metal particles on which the adsorbent exists (has adsorbed), ionization of the non-platinum metal does not easily occur in the solution (the non-platinum metal is not easily eluted). That is, in the present step, platinum is hardly precipitated or is not precipitated on the surface of the non-platinum metal particles on which the adsorbent has adsorbed. Therefore, as the adsorbent is caused to exist in excess on the surface in an amount such as described above, the substitution reaction between the non-platinum metal and platinum ions (alloying of the non-platinum metal and platinum) proceeds locally, and platinum grows into protrusions. Therefore, protrusions (a konpeito-shaped structure) can be efficiently formed.

Furthermore, the amount of addition of the reducing agent in the reducing agent mixed liquid is not particularly limited as long as the non-platinum precursor can be efficiently reduced. For example, the amount of addition of the reducing agent in the reducing agent mixed liquid is preferably 3 mol or more, and more preferably 5 mol or more, with respect to 1 mol of the non-platinum metal precursor (in terms of the metal). The upper limit of the amount of addition of the adsorbent in the reducing agent mixed liquid is not particularly limited; however, the upper limit is preferably 20 mol or less, and more preferably 10 mol or less, with respect to 1 mol of the non-platinum metal precursor (in terms of the metal). When such an amount is used, the non-platinum precursor can be more efficiently reduced.

Mixing of the reducing agent mixed liquid and the non-platinum metal precursor solution is preferably carried out by stirring, in order to achieve uniform mixing. Since the reduction reaction of the non-platinum metal precursor by the reducing agent proceeds more uniformly and more efficiently due to the stirring treatment, the occurrence of any unreduced non-platinum metal precursor can be more effectively suppressed. Furthermore, since the adsorbent is more uniformly distributed on the surface of the non-platinum metal particles, protrusions can be formed more locally and more uniformly in Step (5) that will be described below. Here, the stirring conditions are not particularly limited as long as the stirring conditions are conditions that particularly enable uniform mixing. For example, dispersing and mixing can be achieved uniformly by using an appropriate stirring machine such as a stirrer (for example, a magnetic stirrer) or a homogenizer (for example, an ultrasonic homogenizer), or by applying ultrasonic waves by means of an ultrasonic dispersing apparatus. Furthermore, the mixing conditions are not particularly limited as long as the mixing conditions are conditions in which the reducing agent, the adsorbent, and the non-platinum metal precursor can be uniformly dispersed. Specifically, in the case of using a stirrer (for example, a magnetic stirrer), the stirring speed is preferably 100 to 600 rpm, and more preferably 200 to 400 rpm. Furthermore, the stirring temperature is preferably 10° C. to 50° C., and more preferably 15° C. to 40° C. The stirring time is preferably 5 minutes to 2 hours, and more preferably 10 minutes to 1 hour. The mixing may also be carried out by appropriately combining two or more kinds such as, for example, a stirrer (for example, a magnetic stirrer) and a homogenizer (for example, ultrasonic homogenizer). At this time, two or more operations may be carried out simultaneously or sequentially.

(Step (4))

In the present step, a platinum precursor solution including a platinum precursor is prepared.

Here, the platinum precursor is not particularly limited; however, a platinum salt and a platinum complex can be used. More specific examples that can be used include inorganic salts such as chloroplatinic acid (typically, hexahydrate thereof; $H_2[PtCl_6].6H_2O$), a nitric acid salt such as dinitrodiammine platinum, a sulfuric acid salt, an ammonium salt, an amine, ammine complexes such as tetraammine platinum and hexaammine platinum, a cyano complex, a halogeno complex, a hydroxy complex, a carbonic acid salt, a bicarbonic acid salt, a halide such as a bromide or platinum chloride, a nitrous acid salt, and oxalic acid; carboxylic acid salts such as a sulfamic acid salt and a formic acid salt, a hydroxide, and an alkoxide. The platinum precursors may be used singly, or may be as mixtures of two or more kinds thereof.

The solvent used for the preparation of the platinum precursor solution is not particularly limited, and is selected as appropriate according to the type of the non-platinum metal precursor used. The form of the platinum precursor solution is not particularly limited, and examples include a solution, a dispersion liquid, and a suspension liquid. From the viewpoint that uniform mixing can be achieved, it is preferable that the platinum precursor solution is in the form of a solution. Specific examples include water; organic solvents such as methanol, ethanol, 1-propanol, and 2-propanol; acids, and alkalis. Among these, from the viewpoint of sufficiently dissolving an ionic compound of a non-platinum metal, water is preferred, and it is particularly preferable to use pure water or ultrapure water. The solvents described above may be used singly, or may be used in the form of a mixture of two or more kinds thereof.

The concentration of the platinum precursor in the platinum precursor solution is not particularly limited; however, it is preferable that the concentration is a proportion that constitutes the catalyst particle composition such as described above. For example, the concentration of the platinum precursor in the platinum precursor solution is preferably, in terms of the metal (Pt), 0.1 M (mol/L) or more, more preferably 0.3 M (mol/L) or more, and particularly preferably 0.5 (mol/L) or more. Furthermore, the upper limit of the concentration of the platinum precursor in the platinum precursor solution is not particularly limited; however, the upper limit is preferably, in terms of the metal, 7 M (mol/L) or less, more preferably 5M (mol/L) or less, and particularly preferably 3M (mol/L) or less. When a concentration such as described above is employed, protrusions having a desired size can be formed more efficiently on the surface of the main body.

(Step (5))

In the present step, the non-platinum metal particle dispersion liquid prepared in Step (3) is mixed with the platinum precursor solution prepared in Step (4), the platinum precursor is reduced, and thereby platinum grows on the surface of the non-platinum metal particles to form protrusions.

In the present step, when the non-platinum metal particle dispersion liquid is mixed with the platinum precursor solution, the platinum precursor in an ionic form in the platinum precursor solution induces ionization of the metal that constitutes the non-platinum metal particles, and the platinum precursor itself is reduced to become platinum. Thus, the non-platinum metal that constitutes the non-platinum metal particles is substituted with platinum. As a result of the substitution reaction described above, platinum is precipitated on the surface of the non-platinum metal particles. Meanwhile, since the non-platinum metal particle portion on which the adsorbent exists (has adsorbed) is not brought into contact with platinum ions, the adsorbent inhibits ionization of the non-platinum metal particles. For this reason, on the surface of the non-platinum metal particles on which the adsorbent exists (has adsorbed), ionization of the non-platinum metal does not easily occur in the solution (non-platinum metal is not easily eluted). That is, platinum is not easily precipitated or is not precipitated on the surface of the non-platinum metal particles to which the adsorbent has adsorbed in the present step. Therefore, in the present step, a substitution reaction between the non-platinum metal and platinum ions (alloying between the non-platinum metal and platinum) and a reduction reaction of platinum ions locally proceed by the reducing agent and the adsorbent, and platinum grows (precipitates) into protrusions. Therefore, protrusions (konpeito-shaped structure) can be efficiently formed. Furthermore, on the surface of the non-platinum metal particles where the substitution reaction occurs, a solid solution in which the non-platinum metal and platinum are uniformly intermingled is formed. Therefore, as a result of the present step, an outer shell part (shell part) constructed from a non-platinum metal and platinum is formed so as to cover a central part (core part) formed from a non-platinum metal as a main component.

Here, the method of mixing the non-platinum metal particle dispersion liquid with the platinum precursor solution (method for preparing a mixed liquid of the non-platinum metal particle dispersion liquid and the platinum precursor solution) is not particularly limited. For example, the non-platinum metal, particle dispersion liquid may be added to the platinum precursor solution, or the platinum precursor solution may be added to the non-platinum metal particle dispersion liquid; however, it is preferable to add the platinum precursor solution to the non-platinum metal particle dispersion liquid. Thereby, the state (for example, rate) of the substitution reaction between the non-platinum metal and platinum ions (alloying between the non-platinum metal and platinum) can be controlled more effectively, and the desired size of the protrusions (aspect ratio, diameter, and length) can be achieved more efficiently. The method of adding the solutions is also not particularly limited. For example, the platinum precursor solution may be added to the non-platinum metal particle dispersion liquid all at once or in divided portions. Similarly, the non-platinum metal particle dispersion liquid may be added to the platinum precursor solution all at once or in divided portions.

Furthermore, the mixing ratio between the non-platinum metal particle dispersion liquid and the platinum precursor solution is not particularly limited; however, it is preferable that the mixing ratio is a ratio that achieves the composition of the catalyst particles such as described above.

The conditions for mixing of the non-platinum metal particle dispersion liquid and the platinum precursor solution are not particularly limited. For example, the mixing temperature is preferably 10° C. to 50° C., and more preferably 15° C. to 40° C. Furthermore, mixing of the non-platinum metal particle dispersion liquid and the platinum precursor solution may be carried out without stirring (simply by adding), or mixing may be carried out with stirring. The stirring conditions at the time of performing stirring are not particularly limited as long as the conditions are conditions that particularly enable uniform mixing. For example, uniform dispersing and mixing can be achieved by using an appropriate stirring machine such as a stirrer (for example, a magnetic stirrer) or a homogenizer (for example, an ultrasonic homogenizer), or by applying ultrasonic waves by means of an ultrasonic dispersing apparatus or the like. Furthermore, the mixing conditions are not particularly limited as long as the mixing conditions are conditions in which the reducing agent, the adsorbent, and the non-platinum metal precursor can be uniformly dispersed. Specifically, in the case of using a stirrer (for example, a magnetic stirrer), the stirring speed is preferably 100 to 600 rpm, and more preferably 200 to 400 rpm. The stirring temperature is preferably 10° C. to 50° C., and more preferably 15° C. to 40° C. The stirring time is preferably 5 minutes to 2 hours, and more preferably 10 minutes to 1 hour. The mixing may be carried out by, for example, appropriately combining two or more kinds, such as a stirrer (for example, a magnetic stirrer) and a homogenizer (for example, an ultrasonic homogenizer). At this time, two or more kinds of operations may be carried out simultaneously or sequentially.

The catalyst particles can be obtained as described above. Here, if necessary, the catalyst particles may be isolated from the dispersion liquid obtained as described above. Here, the method of isolation is not particularly limited, and the catalyst particles may be filtered and dried. If necessary, the catalyst particles may be filtered and then washed (for example, washing with water). Also, the processes of filtration and washing, if necessary, may be carried out repeatedly. After the filtration or washing, the catalyst particles may be dried. Here, drying of the catalyst particles may be carried out in air, or may be carried out under reduced pressure. Furthermore, the drying temperature is not particularly limited; however, for example, drying can be carried out at a temperature in the range of 10° C. to 100° C., and preferably in the range of room temperature (25° C.) to about 80° C. Furthermore, the drying time is also not particularly limited; however, for example, drying can be carried out for 1 to 60 hours, and preferably in the range of about 5 to 50 hours.

[Catalyst (Electrode Catalyst)]

As described above, the catalyst particles according to the present invention are such that highly active crystal faces are exposed to a large extent, and the area that can effectively contribute to the reaction is large. For this reason, the catalyst particles have high activity (area specific activity and mass specific activity). Therefore, the catalyst particles can be used as an electrode catalyst, suitably by being supported on an electroconductive carrier. That is, the present invention also provides the catalyst particles of the present invention, and an electrode catalyst having an electroconductive carrier that supports the catalyst particles. The electrode catalyst of the present invention can exhibit and maintain high activity (area specific activity and mass specific activity) even if a small platinum content is used.

The electroconductive carrier functions as a carrier for supporting the catalyst particles described above, and as an electron conduction path that participates in the transfer of electrons between the catalyst particles and other members. The electroconductive carrier may be any carrier having a specific surface area for supporting the catalyst particles in a desired dispersed state and having sufficient electron conductivity as a current collector, and it is preferable that the main component is carbon. When it is said that "the main component is carbon", it is implied that carbon atoms are included as a main component, and it is a concept including both a state of being composed of carbon atoms only and a state of being substantially composed of carbon atoms. Depending on cases, elements other than carbon atoms may also be included in order to enhance the characteristics of the fuel cell. Meanwhile, the phrase "being substantially composed of carbon atoms" means that incorporation of impurities in an amount of about 2% to 3% by weight or less is allowed.

Specific examples of the electroconductive carrier include carbon materials, including carbon blacks such as acetylene black, channel black, oil furnace black, gas furnace black (for example, BALKAN), lamp black, thermal black, and KETJENBLACK (registered trademark); black pearl; graphitized acetylene black; graphitized channel black; graphitized oil furnace black; graphitized gas furnace black; graphitized lamp black; graphitized thermal black; graphitized KETJENBLACK; graphitized black pearl; carbon nanotubes; carbon nanofibers; carbon nanohorns; carbon fibrils; activated carbon; coke; natural graphite; and artificial graphite. Furthermore, zeolite-templated carbon (ZTC) having a structure in which nanosized band-shaped graphene sheets are regularly connected in a three-dimensional form, may also be employed.

The BET specific surface area of the electroconductive carrier may be a specific surface area sufficient for dispersing and supporting the catalyst particles at a high level; however, the BET specific surface area is desirably adjusted to a value of preferably 10 to 5,000 $m^2/g$, and more preferably 50 to 2,000 $m^2/g$. When such a specific surface area is employed, a sufficient amount of the catalyst particles can be supported (highly dispersed) on the electroconductive carrier, and sufficient power generation performance can be achieved. Meanwhile, the "BET specific surface ($m^2/g$ of carrier)" of the carrier is measured by a nitrogen adsorption method.

Furthermore, the size of the electroconductive carrier is not particularly limited; however, from the viewpoints of the ease of supporting, the catalyst utilization ratio, control of the thickness of the electrode catalyst layer to an adequate range, and the like, the average particle size may be adjusted to 5 to 200 nm, and preferably to about 10 to 100 nm. Meanwhile, the "average particle size of the carrier" can be measured as the crystallite diameter that is determined from the half-value width of the diffraction peak of the carrier particles in X-ray diffraction (XRD), or as the average value of the particle sizes of the carrier that are investigated by transmission electron microscopy (TEM). The "average particle size of the carrier" according to the present specification is the average value of the particle sizes of the carrier particles that are investigated from transmission electron microscopic images for a statistically meaningful number (for example, at least 200, and preferably at least 300) of samples. Here, the "particle size" is to mean the maximum distance among the distances between any arbitrary two points on the contour line of a particle.

It is preferable that the electroconductive carrier is a carbon carrier having at least one or more functional groups (hereinafter, also referred to as "particular functional groups") selected from the group consisting of a lactone group, a hydroxyl group, an ether group, and a carbonyl group on the surface in a total amount of 0.5 $\mu mol/m^2$ or more. More preferably, the electroconductive carrier is a carbon carrier having at least one or more functional groups selected from the group consisting of a lactone group, a hydroxyl group, an ether group, and a carbonyl group on the surface in a total amount of 0.8 to 5 $\mu mol/m^2$. When such a carbon carrier is used, the aspect ratio of the protrusions of the catalyst particles thus obtainable can be controlled more easily, and the activity (area specific activity and mass specific activity) can be further enhanced. This is speculated to be because aggregation of the alloy particles can be suppressed even if a heat treatment for obtaining catalyst particles is carried out, and a decrease in the total specific surface area of the catalyst particles that are supported can be suppressed.

Here, regarding the method for measuring the amount of functional groups, a value measured by a temperature-programmed desorption method is employed. The temperature-programmed desorption method is a technique of increasing the temperature of a sample at a constant rate in an ultrahigh vacuum and detecting in real time the gas components (molecules and atoms) emitted from the sample using a quadrupole mass spectrometer. The temperature at which a gas component is emitted depends on the adsorption/chemical bonding state of that component on the sample surface. That is, a component that requires large energy for desorption/dissociation is detected at a relatively high temperature. Surface functional groups formed on carbon are discharged as CO or $CO_2$ at different temperatures depending on the type of the functional group. A temperature-programmed desorption curve obtained for CO or $CO_2$ is subjected to peak resolution, the integrated intensity T of each peak is measured, and the amount ($\mu mol$) of each functional group component can be calculated from the integrated intensity T. From this amount ($\mu mol$), the amount of a functional group is calculated by the following formula:

[Mathematical Formula 1]
$$\text{Amount of functional group } (\mu mol/m^2) = \frac{\text{Amount of each functional group component } (\mu mol)}{\text{BET specific surface area of carrier } (m^2/g) \times \text{sample amount } (g)}$$

Amount of functional group ($\mu mol/m^2$)=[Amount of each functional group component ($\mu mol$)]/[BET specific surface area of carrier ($m^2/g$)×sample amount (g)]

The gases and temperatures of desorption caused by temperature increase for various functional groups are as follows: lactone group: $CO_2$ (700° C.), hydroxyl group: CO (650° C.), ether group: CO (700° C.), and carbonyl group: CO (800° C.).

Furthermore, according to the present invention, values measured by the apparatus and conditions as described below are employed.
[Chemical Formula 1]
Apparatus: WA1000S/W manufactured by ESCO, Ltd.
Degree of vacuum in sample chamber: in the order of $10^{-7}$ to $10^{-8}$ Pa
Heating system: infrared radiation
Rate of temperature increase: 60° C./min The carbon carrier having a particular functional group may be a commercially available product or may be produced. In the latter case, the method for producing the carbon carrier having a particular functional group is not particular limited; however, for example, the carbon carrier can be obtained by bringing a carbon material listed above as an electroconductive carrier into contact with an acidic solution, and then performing a heat treatment (hereinafter, also referred to as "acid treatment"); steam activation treatment; vapor phase oxidation treatment (ozone, fluorine gas, or the like); liquid phase oxidation treatment (permanganic acid, chloric acid, ozonated water, or the like), or the like.

In the following description, an acid treatment as a suitable embodiment will be explained.

The acid used for the acidic solution is not particularly limited; however, examples include hydrochloric acid, sulfuric acid, nitric acid, and perchloric acid. Among them, from the viewpoint of forming a surface functional group, it is preferable to use at least one of sulfuric acid and nitric acid.

The carbon material that is brought into contact with the acidic solution is not particularly limited; however, from the viewpoint of having a large specific surface area and being stable even against an acid treatment, the carbon material is preferably carbon black.

The acid treatment may be carried out not only by bringing the carrier into contact with an acidic solution once, but also may be repeated several times. In a case in which the acid treatment is carried out several times, the type of the acidic solution may be varied for each treatment. The concentration of the acidic solution is set as appropriate in consideration of the carbon material, the type of acid, and the like; however, the concentration is preferably set to 0.1 to 10 mol/L.

Regarding the method of bringing the carbon material into contact with an acidic solution, it is preferable to mix the carbon material with the acidic solution. Furthermore, it is preferable that the mixed liquid is stirred in order to allow uniform mixing. Here, the stirring conditions are not particularly limited as long as the stirring conditions are conditions particularly capable of uniform mixing. For example, uniform dispersing and mixing can be achieved by using an appropriate stirring machine such as a stirrer or a homogenizer, or by applying ultrasonic waves by means of an ultrasonic dispersing apparatus. Furthermore, the stirring temperature is preferably 5° C. to 40° C. Furthermore, the stirring time may be set as appropriate such that dispersing is carried out sufficiently, and the stirring time is usually 1 to 60 minutes, and preferably 3 to 30 minutes.

The heat treatment after contacting is set as appropriate such that the particular functional group is introduced in the amount described above; however, the heat treatment temperature is preferably 20° C. to 90° C., and more preferably 60° C. to 80° C. Furthermore, the heat treatment time is preferably 30 minutes to 10 hours, and more preferably 1 hour to 4 hours. The heat treatment may be carried out while the system is stirred. The stirring conditions at the time of stirring are not particularly limited, as long as the stirring conditions are conditions in which the heat treatment can proceed uniformly. For example, uniform dispersing and mixing can be achieved by using an appropriate stirring machine such as a stirrer (for example, a magnetic stirrer), a homogenizer (for example, an ultrasonic homogenizer), or the like, or by applying ultrasonic waves by means of an ultrasonic dispersing apparatus. Furthermore, in the case of using a stirrer (for example, a magnetic stirrer), the stirring speed is preferably 100 to 600 rpm, and more preferably 200 to 400 rpm.

Through the heat treatment described above, an electroconductive carrier having a particular functional group is obtained. Here, if necessary, this carrier may be isolated. Here, the method of isolation is not particularly limited, and the carrier may be filtered and dried. If necessary the carrier may be filtered and then washed (for example, washing with water). Furthermore, the processes of filtration and washing, if necessary, may be carried out repeatedly. Furthermore, after the filtration or washing, the carrier may be dried. Here, drying of the carrier may be carried out in air, or may be carried out under reduced pressure. The drying temperature is not particularly limited; however, drying can be carried out at, for example, 10° C. to 100° C., and more preferably in the range of room temperature (25° C.) to about 80° C. The drying time is also not particularly limited; however, for example, the drying time is 1 to 60 hours, and preferably 5 to 48 hours.

Meanwhile, in a case in which the electroconductive carrier has a particular functional group as a result of the acid treatment, the BET specific surface area of the electroconductive carrier is not particularly limited; however, the BET specific surface area is preferably 10 to 5,000 m²/g, and more preferably 50 to 2,000 m²/g. When such a BET specific surface area is used, an appropriate specific surface area can be secured, a sufficient amount of the catalyst particles can be supported (highly dispersed) on the electroconductive carrier, and sufficient power generation performance can be achieved. Furthermore, the size of the electroconductive carrier in this case is also not particularly limited; however, it is desirable that the average particle size is adjusted to 5 to 200 nm, and preferably about 10 to 100 nm. When an electroconductive carrier having such a size is used, a sufficient amount of catalyst particles can be supported (highly dispersed) on the electroconductive carrier by securing an appropriate size, and thereby sufficient power generation performance can be achieved.

In regard to the electrode catalyst having catalyst particles supported on an electroconductive carrier, the supporting concentration (amount of supporting) of the catalyst particles is not particularly limited; however, the supporting concentration is preferably set to 2% to 70% by weight with respect to the total amount of the carrier. When the supporting concentration is adjusted to such a range, aggregation between the catalyst particles is suppressed, and an increase in the thickness of the electrode catalyst layer can be suppressed, which is preferable. The supporting concentration is more preferably 5% to 60% by weight, even more preferably more than 5% by weight and less than or equal to 50% by weight, and particularly preferably 10% to 45% by weight. When the amount of supporting of the catalyst component has a value within such a range, a balance between the degree of dispersity of the catalyst component on the catalyst carrier and the catalytic performance can be appropriately controlled. The amount of supporting of the catalyst component can be investigated according to conventionally known methods such as inductively coupled plasma emission analysis (ICP atomic emission spectrometry), inductively coupled plasma mass analysis (ICP mass spectrometry), and X-ray fluorescence analysis (XRF).

[Method for Producing Catalyst (Electrode Catalyst)]

The catalyst (electrode catalyst) can be produced using a known method, except that the catalyst particles of the present invention are used. For example, in regard to the method described in the section [Method for producing catalyst particles], the catalyst (electrode catalyst) may be produced by adding an electroconductive carrier (carbon carrier) to a non-platinum metal precursor solution and a reducing agent mixed liquid and mixing the mixture in Step (3) (Method (i)). Alternatively, the catalyst (electrode catalyst) may also be produced by producing catalyst particles according to the method described in the section [Method for producing catalyst particles] and then mixing the catalyst particles with an electroconductive carrier (carbon carrier) (Method (ii)). In the following description, Method (i) and Method (ii) will be explained. The present invention is not limited by these methods, and the catalyst (electrode catalyst) may also be produced by other methods.

(Method (i))

According to the present embodiment, the catalyst (electrode catalyst) is produced according to the method described in the section [Method for producing catalyst particles], except that an electroconductive carrier (carbon carrier) is added to the non-platinum metal precursor solution and the reducing agent mixed liquid, and the mixture is mixed, in Step (3) described above.

Here, the mixing ratio between the non-platinum metal precursor solution and the electroconductive carrier is not particularly limited; however, it is preferable that the mixing ratio provides amounts that give a supporting concentration (amount of supporting) of the catalyst particles such as described above.

The mixing order of the non-platinum metal precursor solution, the reducing agent mixed liquid, and the electroconductive carrier (carbon carrier) is not particularly limited. For example, any of the following may be employed: the non-platinum metal precursor solution and the electroconductive carrier are mixed, and then the reducing agent mixed liquid is added thereto; the non-platinum metal precursor solution and the reducing agent mixed liquid are mixed, and then the electroconductive carrier is added thereto; the reducing agent mixed liquid and the electroconductive carrier are mixed, and then the non-platinum metal precursor solution is added thereto; and the non-platinum metal precursor solution, the reducing agent mixed liquid, and the electroconductive carrier are added all at once or in divided portions. Preferably, the non-platinum metal precursor solution and the electroconductive carrier are mixed, and then the reducing agent mixed liquid is added thereto. According to this method, the distribution of the adsorbent on the surface of the non-platinum metal particles can be made more uniform. Therefore, in the subsequent Step (5), protrusions can be formed more uniformly and more position-selectively. Furthermore, it is easy to appropriately control the rate of reduction of the non-platinum metal precursor, and non-platinum metal particles (main body) having a predetermined size can be formed more efficiently. Furthermore, a portion of the non-platinum metal particles can be supported on the electroconductive carrier. The electroconductive carrier may be mixed directly, or may be added in the form of a solution.

Furthermore, it is preferable that the non-platinum metal precursor solution and the electroconductive carrier are mixed, and then the mixture is stirred. Since the non-platinum metal precursor (non-platinum metal precursor particles) and the electroconductive carrier are mixed uniformly thereby, it is possible to disperse and support the non-platinum metal particles on the electroconductive carrier at a high level. Furthermore, since a reduction reaction of unreduced non-platinum metal precursor by means of the reducing agent also occurs at the same time as a result of the stirring treatment described above, it is also possible to cause dispersing and supporting the non-platinum metal particles on the electroconductive carrier to proceed at a higher level. Here, the stirring conditions are not particularly limited; however, specifically, the stirring conditions are similar to the conditions employed in Step (3) described above.

Furthermore, in the present Method (i), a dispersion liquid including the catalyst particles (catalyst particle-containing dispersion liquid) may be stirred again after Step (5) is completed. Since the catalyst particles and the electroconductive carrier are mixed more uniformly thereby, the catalyst particles can be efficiently dispersed and supported at a high level by the electroconductive carrier. Furthermore, since a reduction reaction of unreduced platinum precursor or unreduced non-platinum metal precursor by the reducing agent also occurs at the same time as a result of the stirring treatment described above, it is also possible to cause dispersing and supporting of the catalyst particles on the electroconductive carrier to proceed at a higher level. Herein, the stirring conditions are not particularly limited as long as the stirring conditions are conditions in which supporting of the catalyst particles on the electroconductive carrier can proceed further. For example, uniform dispersing and mixing can be achieved by using an appropriate stirring machine such as a stirrer (for example, a magnetic stirrer), a homogenizer (for example, an ultrasonic homogenizer), or the like, or by applying ultrasonic waves by means of an ultrasonic dispersing apparatus. Furthermore, the mixing conditions are not particularly limited as long as the mixing conditions are conditions in which the reducing agent, the adsorbent, and the non-platinum metal precursor can be uniformly dispersed. Specifically, in the case of using a stirrer (for example, a magnetic stirrer), the stirring speed is preferably 100 to 600 rpm, and more preferably 200 to 400 rpm. The stirring temperature is preferably 0° C. to 50° C., and more preferably 5° C. to 40° C. The stirring time is preferably 0.3 to 90 hours, and more preferably 0.5 to 80 hours. The mixing may be carried out by, for example, appropriately combining two or more kinds such as a stirrer (for example, a magnetic stirrer) and a homogenizer (for example, an ultrasonic homogenizer). Furthermore, at this time, two or more kinds of operations may be carried out simultaneously or sequentially.

As a result of the treatments described above, an electroconductive carrier having catalyst particles supported thereon (catalyst particle-supported carrier or supporting carrier) is obtained. Here, if necessary, this supporting carrier may be isolated. Here, the method of isolation is not particularly limited, and the supporting carrier may be filtered and dried. Meanwhile, if necessary, the supporting carrier may be filtered and then washed (for example, washing with water). The processes of filtration and washing, if necessary, may be carried out repeatedly. Furthermore, after the filtration or washing, the supporting carrier may be dried. Here, drying of the supporting carrier may be carried out in air, or may be carried out under reduced pressure. The drying temperature is not particularly limited; however, drying can be carried out at, for example, 10° C. to 100° C., and more preferably in the range of room temperature (25° C.) to about 80° C. Furthermore, the drying time is not particularly limited; however, the drying time is, for example, 1 to 60 hours, and preferably 3 to 48 hours. Drying may be carried out in air, or may be carried out in an inert atmosphere (a nitrogen gas atmosphere, a helium gas atmosphere, or an argon gas atmosphere).

(Method (ii))

According to the present embodiment, the catalyst (electrode catalyst) is produced by producing catalyst particles according to the method described in the section [Method for producing catalyst particles], and then mixing the catalyst particles with an electroconductive carrier (carbon carrier).

Here, the mixing ratio between the catalyst particles and the electroconductive carrier is not particularly limited; however, it is preferable that the mixing ratio provides amounts that give a supporting concentration (amount of supporting) of the catalyst particles such as described above. Meanwhile, the electroconductive carrier may be mixed directly, or may be added in the form of a solution. Similarly, the catalyst particles may be mixed in the form of a solid, or may be added in the form of a solution. Preferably, at least one of the catalyst particles and the electroconductive carrier is mixed in the form of a solution. More preferably, both the catalyst particles and the electroconductive carrier are mixed in the form of a solution. Since the catalyst particles and the electroconductive carrier are more uniformly mixed thereby, it is possible to uniformly disperse and support the catalyst particles by the electroconductive carrier.

The mixing order of the catalyst particles (or catalyst particle solution) and the electroconductive carrier (or electroconductive carrier solution) is not particularly limited. For example, any of the following may be employed: the electroconductive carrier (or electroconductive carrier solution) is added to the catalyst particles (or catalyst particle solution); the catalyst particles (or catalyst particle solution) are added to the electroconductive carrier (or electroconductive carrier solution); and the catalyst particles (or catalyst particle solution) and the electroconductive carrier (or electroconductive carrier solution) are simultaneously added and mixed.

Furthermore, a mixed liquid resulting from mixing of the catalyst particles (or catalyst particle solution) and the electroconductive carrier (or electroconductive carrier solution) may be stirred. Since the catalyst particles and the electroconductive carrier are more uniformly mixed thereby, the catalyst particles can be efficiently dispersed and supported at a high level by the electroconductive carrier. Furthermore, since a reduction reaction of unreacted platinum precursor or unreacted non-platinum metal precursor by means of a reducing agent also occurs simultaneously as a result of the stirring treatment described above, it is also possible to cause dispersing and supporting of the catalyst particles on an electroconductive carrier to proceed at a higher level. Here, the stirring conditions are not particularly limited as long as the stirring conditions are conditions in which supporting of the catalyst particles on an electroconductive carrier can proceed further. For example, uniform dispersing and mixing can be carried out by using an appropriate stirring machine such as a stirrer (for example, a magnetic stirrer) or a homogenizer (for example, an ultrasonic homogenizer), or by applying ultrasonic waves by means of an ultrasonic dispersing apparatus or the like. Furthermore, the mixing conditions are not particularly limited as long as the mixing conditions are conditions in which the reducing agent, an adsorbent, and a non-platinum metal precursor can be uniformly dispersed. Specifically, in the case of using a stirrer (for example, a magnetic stirrer), the stirring speed is preferably 100 to 600 rpm, and more preferably 200 to 400 rpm. The stirring temperature is preferably 0° C. to 50° C., and more preferably 5° C. to 40° C. The stirring time is preferably 0.5 to 60 hours, and more preferably 1 to 48 hours. The mixing may be carried out by, for example, combining two or more kinds such as a stirrer (for example, a magnetic stirrer) and a homogenizer (for example, an ultrasonic homogenizer). At this time, two or more kinds of operations may be carried out simultaneously or sequentially.

Through the treatments described above, an electroconductive carrier having catalyst particles supported thereon (catalyst particle-supported carrier or supporting carrier) is obtained. Here, if necessary, this supporting carrier may be isolated. Here, the method of isolation is not particularly limited, and the supporting carrier may be filtered and dried. If necessary, the supporting carrier may be filtered and then washed (for example, washing with water). The processes of filtration and washing, if necessary, may be carried out repeatedly. Furthermore, after filtration or washing, the supporting carrier may be dried. Here, drying of the supporting carrier may be carried out in air, or may be carried out under reduced pressure. The drying temperature is not particularly limited; however, for example, drying can be carried out at 10° C. to 100° C., and more preferably in the range of room temperature (25° C.) to about 80° C. Furthermore, the drying time is not particularly limited; however, for example, the drying time is 1 to 60 hours, and preferably 3 to 48 hours. Drying may be carried out in air, or may be carried out in an inert atmosphere (a nitrogen gas atmosphere, a helium gas atmosphere, or an argon gas atmosphere).

The electrode catalyst described above can be suitably used in an electrolyte membrane-electrode assembly (MEA) and a fuel cell. That is, the present invention also provides an electrolyte membrane-electrode assembly (MEA) including the electrode catalyst obtained according to the production method described above, and a fuel cell including the electrolyte membrane-electrode assembly (MEA).

[Fuel Cell]

A fuel cell has an electrolyte membrane-electrode assembly (MEA); and a pair of separators composed of an anode side separator having a fuel gas flow channel through which a fuel gas flows, and a cathode side separator having an oxidizing agent gas flow channel through which an oxidizing agent gas flows. The fuel cell of the present invention can exhibit superior power generation performance.

Figure 2:
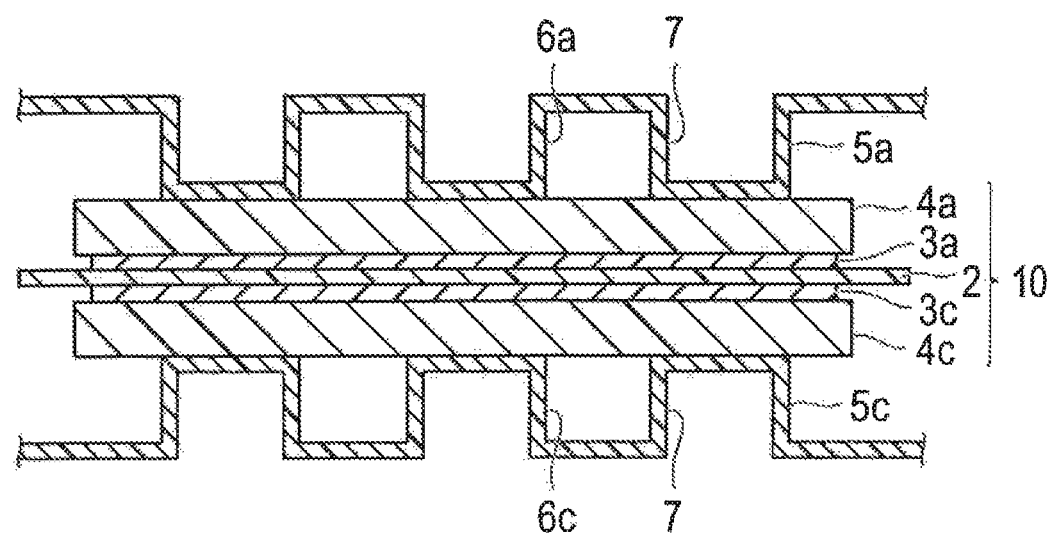
FIG. 2 is an outline cross-sectional view illustrating the basic configuration of a polymer electrolyte fuel cell according to an embodiment of the present invention.

FIG. 2 is an outline diagram illustrating the basic configuration of a polymer electrolyte fuel cell (PEFC) 1 according to an embodiment of the present invention. PEFC 1 has, first, a solid polymer electrolyte membrane 2 and a pair of catalyst layers (anode catalyst layer 3a and cathode catalyst layer 3c) sandwiching this electrolyte membrane. A laminate of the solid polymer electrolyte membrane 2 and the catalyst layers (3a and 3c) is further sandwiched between a pair of gas diffusion layers (GDL) (anode gas diffusion layer 4a and cathode gas diffusion layer 4c). As such, a solid polymer electrolyte membrane 2, a pair of catalyst layers (3a and 3c), and a pair of gas diffusion layers (4a and 4c) in a laminated state constitute an electrolyte membrane-electrode assembly (MEA) 10.

In the PEFC 1, the MEA 10 is further sandwiched by a pair of separators (anode separator 5a and cathode separator 5c). In FIG. 2, the separators (5a and 5c) are depicted such that the separators are positioned at two ends of the MEA 10 depicted in the diagram. However, in a fuel cell stack formed by laminating a plurality of MEAs, it is general that the separators are also used as separators for adjacent PEFCs (not shown in the diagram). In other words, in a fuel cell stack, the MEAs are laminated in sequence, with separators being interposed therebetween, and thereby constitute a stack. Meanwhile, in an actual fuel cell stack, a gas sealing unit is disposed between the separators (5a and 5c) and the solid polymer electrolyte membrane 2 or between a PEFC 1 and another PEFC adjacent thereto; however, description of these is not shown in FIG. 2.

A separator (5a or 5c) is obtained by, for example, subjecting a thin plate having a thickness of 0.5 mm or less to a pressing treatment, and thereby shaping the thin plate into a concavo-convex shape such as shown in FIG. 2. Convexities seen from the MEA side of the separator (5a or 5c) are in contact with the MEA 10. Thereby, electrical connection with the MEA 10 is secured. Furthermore, concavities seen from the MEA side of the separator (5a or 5c) (spaces between the separator and the MEA produced due to the shape of the concavo-convex shape of the separator) function as gas flow channels for causing a gas flow at the time of operating the PEFC 1. Specifically, a fuel gas (for example, hydrogen) is caused to flow through a gas flow channel 6a of the anode separator 5a, and an oxidizing agent gas (for example, air) is caused to flow through a gas flow channel 6c of the cathode separator 5c.

On the other hand, concavities seen from the opposite side of the MEA side of the separator (5a or 5c) work as coolant flow channels 7 for causing a flow of a coolant (for example, water) for cooling the PEFC at the time of operating the PEFC 1. Furthermore, the separators are usually provided with a manifold (not shown in the diagram). This manifold functions as a connecting means for connecting various cells when a stack is constructed. By employing such a configuration, mechanical strength of the fuel cell stack can be secured.

In the embodiment illustrated in FIG. 2, the separators (5a and 5c) are formed to have a concavo-convex shape. However, the separators are not limited to have such a concavo-convex shape, and may have any arbitrary shape such as a flat shape or a partially concavo-convex shape, as long as the separators can exhibit the functions as gas flow channels and coolant flow channels.

A fuel cell having the MEA of the present invention as described above exhibits excellent power generation performance. Here, the type of the fuel cell is not particularly limited. In the explanation given above, a polymer electrolyte fuel cell has been taken as an example for the explanation; however, in addition to this, an alkali type fuel cell, a direct methanol type fuel cell, a microfuel cell, and the like may be used. Above all, a preferred example may be a polymer electrolyte fuel cell (PEFC), which is small-sized and enables density increase and power output increase. Furthermore, the fuel cell is useful as a stationary power source or the like, in addition to a power source for a moving body, such as a vehicle with a limited mounting space. Above all, it is particularly preferable that the fuel cell is used as a power source for a moving body, such as a car, which is required to have high output voltage after stopping of driving for a relatively long time.

The fuel used at the time of operating a fuel cell is not particularly limited. For example, hydrogen, methanol, ethanol, 1-propanol, 2-propanol, 1-butanol, secondary butanol, tertiary butanol, dimethyl ether, diethyl ether, ethylene glycol, and diethylene glycol can be used. Among them, hydrogen or methanol is preferably used from the viewpoint that high power output is obtained.

The use applications of fuel cells are not particularly limited; however, it is preferable that fuel cells are applied to vehicles. The electrolyte membrane-electrode assembly of the present invention has excellent power generation performance and durability, and size reduction can be realized. Therefore, the fuel cell of the present invention is particularly advantageous when applied to vehicles, from the viewpoint of vehicle mountability.

[Electrolyte Membrane-Electrode Assembly (MEA)]

The electrode catalyst described above can be suitably used in an electrolyte membrane-electrode assembly (MEA). That is, the present invention also provides an electrolyte membrane-electrode assembly (MEA), particularly an electrolyte membrane-electrode assembly (MEA) for a fuel cell, which includes the electrode catalyst of the present invention. The electrolyte membrane-electrode assembly (MEA) of the present invention can exhibit superior power generation performance. Furthermore, the electrolyte membrane-electrode assembly (MEA) of the present invention can also exhibit high durability.

In regard to the electrolyte membrane-electrode assembly (MEA) of the present invention, a similar configuration can be applied, except that the electrode catalyst (catalyst) of the present invention is used instead of a conventional electrode catalyst. In the following description, a preferred embodiment of the MEA of the present invention will be described; however, the present invention is not limited to the embodiment described below.

A MEA is configured to include an electrolyte membrane; and an anode catalyst layer, an anode gas diffusion layer, a cathode catalyst layer, and a cathode gas diffusion layer, which are formed sequentially on both surfaces of the electrolyte membrane. In this electrolyte membrane-electrode assembly, the electrode catalyst of the present invention is used in at least any one of the cathode catalyst layer and the anode catalyst layer.

(Electrolyte Membrane)

The electrolyte membrane is constructed from, for example, a solid polymer electrolyte membrane. This solid polymer electrolyte membrane has a function of, for example, selectively transmitting protons produced in the anode catalyst layer at the time of operating a fuel cell (PEFC or the like) to the cathode catalyst layer along the film thickness direction. Furthermore, the solid polymer electrolyte membrane also has a function as a partition wall for preventing mixing of the fuel gas supplied to the anode side and the oxidizing agent gas supplied to the cathode side.

The electrolyte material that constitutes the solid polymer electrolyte membrane is not particularly limited, and conventionally known findings can be referred to as appropriate. For example, a fluorine-based polymer electrolyte or a hydrocarbon-based polymer electrolyte, which will be explained below as a polymer electrolyte in the catalyst layer described below, can be used in a similar manner. At this time, it is not necessarily required to use the same polymer electrolyte as the polymer electrolyte used in the catalyst layer.

The thickness of the electrolyte membrane may be determined as appropriate in consideration of the characteristics of the fuel cell thus obtainable, and there are no particular limitations. The thickness of the electrolyte membrane is usually about 5 to 300 μm. When the thickness of the electrolyte membrane has a value within such a range, a balance between the strength at the time of film forming or durability at the time of use and the output characteristics at the time of use can be appropriately controlled.

(Catalyst Layer)

A catalyst layer is a layer in which a cell reaction actually proceeds. Specifically, an oxidation reaction of hydrogen occurs in an anode catalyst layer, and a reduction reaction of oxygen occurs in a cathode catalyst layer. Here, the catalyst of the present invention may exist in any of the cathode catalyst layer and the anode catalyst layer. When the need for enhancing the oxygen reducing activity is considered, it is preferable that the electrode catalyst of the present invention is used in at least the cathode catalyst layer. However, the catalyst layer according to the above-described embodiment may be used as an anode catalyst layer, or may be used as both the cathode catalyst layer and the anode catalyst layer, and there are no particular limitations.

The catalyst layer includes the electrode catalyst of the present invention and an electrolyte. The electrolyte is not particularly limited; however, it is preferable that the electrolyte is an ion-conductive polymer electrolyte. The polymer electrolyte is also referred to as proton-conductive polymer, from the viewpoint of accomplishing a role of transferring protons generated in the vicinity of the catalytic active substance on the fuel electrode side.

This polymer electrolyte is not particularly limited, and conventionally known findings may be referred to as appropriate. Polymer electrolytes are roughly classified into fluorine-based polymer electrolytes and hydrocarbon-based polymer electrolytes, depending on the type of the ion exchange resin as a constituent material.

Examples of the ion exchange resin that constitutes a fluorine-based polymer electrolyte include perfluorocarbon sulfonic acid-based polymers such as NAFION (registered trademark, manufactured by DuPont Company), ACIPLEX (registered trademark, manufactured by Asahi Kasei Corp.), and FLEMION (registered trademark, manufactured by Asahi Glass Co., Ltd.); perfluorocarbon phosphonic acid-based polymers, trifluorostyrenesulfonic acid-based polymers, ethylenetetrafluoroethylene-g-styrenesulfonic acid-based polymers, ethylene-tetrafluoroethylene copolymers, and polyvinylidene fluoride-perfluorocarbon sulfonic acid-based polymers. From the viewpoint of having excellent heat resistance, chemical stability, durability, and mechanical strength, these fluorine-based polymer electrolytes are preferably used, and particularly preferably, a fluorine-based polymer electrolyte formed from a perfluorocarbon sulfonic acid-based polymer is used.

Specific examples as the hydrocarbon-based electrolyte include sulfonated polyethersulfone (S-PES), sulfonated polyaryl ether ketone, sulfonated polybenzimidazole, phosphonated polybenzimidazole, sulfonated polystyrene, sulfonated polyether ether ketone (S-PEEK), and sulfonated polyphenylene (S-PPP). From the viewpoint of production such as that the raw materials are inexpensive, the production processes are simple, and the materials have high selectivity, these hydrocarbon-based polymer electrolytes are preferably used. The ion exchange resins mentioned above may be used singly, or two or more kinds thereof may be used in combination. Furthermore, the electrolyte is not limited only to the materials mentioned above, and other material may also be used.

In regard to the polymer electrolyte that is in charge of the transfer of protons, the proton conductivity becomes important. Here, in a case in which the EW of the polymer electrolyte is too high, ion conductivity of the catalyst layer as a whole is decreased. Therefore, it is preferable that the catalyst layer of the present embodiment includes a polymer electrolyte having a small EW. Specifically, the catalyst layer of the present embodiment preferably includes a polymer electrolyte having an EW of 1,500 g/eq. or less, more preferably includes a polymer electrolyte having an EW of 1,200 g/eq. or less, and particularly preferably includes a polymer electrolyte having an EW of 1,000 g/eq. or less. On the other hand, if the EW is too small, hydrophilicity becomes too high, and it is difficult for water to move smoothly. From these viewpoints, the EW of the polymer electrolyte is preferably 600 or higher. Meanwhile, the term EW (Equivalent Weight) indicates equivalent weight of exchange groups having proton conductivity. The equivalent weight is dry weight of the ion exchange membrane per equivalent of ion exchange groups, and is expressed in the unit "g/eq".

The catalyst layer includes two or more kinds of polymer electrolytes having different EW values within the power generating plane, and in this case, it is preferable to use a polymer electrolyte having the lowest EW value among the polymer electrolytes in a region in which the relative humidity of the gas in the flow channel is 90% or lower. When such a material disposition is employed, the resistance value becomes smaller irrespective of the current density region, and an enhancement of the battery performance can be promoted. It is desirable that the EW of the polymer electrolyte used in a region in which the relative humidity of the gas in the flow channel is 90% or lower, that is, the polymer electrolyte having the lowest EW value, is 900 g/eq. or less. Thereby, the above-mentioned effects become more reliable and noticeable.

Furthermore, it is desirable that the polymer electrolyte having the lowest EW value is used in a region in which the temperature is higher than the average temperature of the inlet and outlet of cooling water. Thereby, the resistance value becomes smaller irrespective of the current density region, and a further enhancement of the battery performance can be promoted.

From the viewpoint of making the resistance value of the fuel cell system small, it is desirable that the polymer electrolyte having the lowest EW value is used in a region extending to a length in the range of ⅗ or less from the gas supply port of at least one of the fuel gas and the oxidizing agent gas with respect to the flow channel length.

In the catalyst layer, additives such as a water repellent such as polytetrafluoroethylene, polyhexafluoropropylene, or a tetrafluoroethylene-hexafluoropropylene copolymer; a dispersant such as a surfactant; a thickening agent such as glycerin, ethylene glycol (EG), polyvinyl alcohol (PVA), or propylene glycol (PG); and a pore-forming agent may also be included, as necessary.

The film thickness (dry film thickness) of the catalyst layer is preferably 0.05 to 30 μm, more preferably 1 to 20 μm, and even more preferably 2 to 15 nm. The above-described film thickness is applicable to both the cathode catalyst layer and the anode catalyst layer. However, the cathode catalyst layer and the anode catalyst layer may be the same or may be different.

(Gas Diffusion Layer)

Gas diffusion layers (anode gas diffusion layer 4a and cathode gas diffusion layer 4c) have a function of accelerating diffusion of a gas (fuel gas or oxidizing agent gas) supplied through the gas flow channels (6a and 6c) of the separators into the catalyst layers (3a and 3c), and a function as electron conduction paths.

The material that constitutes the base material of the gas diffusion layers (4a and 4c) is not particularly limited, and conventionally known findings can be referred to as appropriate. Examples include sheet-like materials having electrical conductivity and porosity, such as woven fabrics made of carbon, paper-like papermaking product, felt, and nonwoven fabrics. The thickness of the base material may be determined as appropriate in consideration of the characteristics of the gas diffusion layer thus obtainable; however, the thickness may be adjusted to about 30 to 500 μm. When the thickness of the base material has a value within such a range, a balance between the mechanical strength and the diffusibility of gas and water can be appropriately controlled.

It is preferable that the gas diffusion layers include a water repellent for the purpose of further enhancing water repellency and preventing a flooding phenomenon or the like. The water repellent is not particularly limited; however, examples include fluorine-based polymer materials such as polytetrafluoroethylene (PTFE), polyvinylidene fluoride (PVdF), polyhexafluoropropylene, and a tetrafluoroethylene-hexafluoropropylene copolymer (FEP); polypropylene, and polyethylene.

In order to further enhance water repellency, the gas diffusion layer may have a carbon particle layer formed from aggregates of carbon particles including a water repellent (microporous layer; MPL, not shown in the diagram) on the catalyst layer side of the base material.

The carbon particles that are included in the carbon particle layer are not particularly limited, and conventionally known materials such as carbon black, graphite, and expanded graphite can be employed as appropriate. Above all, carbon blacks such as oil furnace black, channel black, lamp black, thermal black, and acetylene black can be preferably used, from the viewpoint of having excellent electron conductivity and large specific surface areas. The average particle size of the carbon particles may be adjusted to about 10 to 100 nm. Thereby, high draining properties based on capillarity is obtained, and also, contact characteristics with the catalyst layer can also be enhanced.

Regarding the water repellent used in the carbon particle layer, water repellents similar to the above-mentioned water repellents may be mentioned. Among them, fluorine-based polymer materials can be preferably used, from the viewpoint of having excellent water repellency, corrosion resistance at the time of the electrode reaction, and the like.

It is desirable that the mixing ratio between the carbon particles and the water repellent in the carbon particle layer is adjusted to a weight ratio of 90:10 to 40:60 (carbon particles:water repellent), in consideration of the balance between water repellency and electron conductivity. Meanwhile, the thickness of the carbon particle layer is not particularly limited and may be determined as appropriate in consideration of water repellency of the gas diffusion layer thus obtainable.

(Method for Producing Electrolyte Membrane-Electrode Assembly)

The method for producing an electrolyte membrane-electrode assembly is not particularly limited, and conventionally known methods can be used. For example, a method of transferring or applying a catalyst layer on an electrolyte membrane by hot pressing, drying this, and joining a gas diffusion layer thereto; or a method of applying in advance a catalyst layer on the microporous layer side of the gas diffusion layer (in a case in which a microporous layer is not included, one surface of the base material layer, drying the catalyst layer, thereby producing two sheets of gas diffusion electrodes (GDE), and joining these gas diffusion electrodes on both surfaces of a solid polymer electrolyte membrane by hot pressing, can be used. The conditions for application and joining such as hot pressing may be adjusted as appropriate according to the type of the polymer electrolyte (perfluoro- sulfonic acid-based or hydrocarbon-based) in the solid polymer electrolyte membrane or the catalyst layer.

[Fuel Cell]

The electrolyte membrane-electrode assembly (MEA) described above can be suitably used in a fuel cell. That is, the present invention also provides a fuel cell formed using the electrolyte membrane-electrode assembly (MEA) of the present invention. The fuel cell of the present invention can exhibit superior power generation performance and durability. Here, the fuel cell of the present invention has a pair of an anode separator and a cathode separator that sandwich the electrolyte membrane-electrode assembly of the present invention.

(Separator)

A separator has a function of electrically connecting various cells in series when a fuel cell stack is configured by connecting a plurality of single cells of a fuel cell such as a polymer electrolyte fuel cell in series. Furthermore, the separator also has a function as a partition wall that separates a fuel gas, an oxidizing agent gas, and a cooling agent from each other. In order to secure flow channels for these, as described above, it is preferable that the respective separators are provided with gas flow channels and coolant flow channels. Regarding the material that constitutes the separator, conventionally known materials, including carbon such as dense carbon graphite or a carbon plate; or a metal such as stainless steel, can be employed as appropriate, without any limitations. The thickness or size of the separator, the shape or size of the various flow channels that are provided, and the like are not particularly limited and can be determined as appropriate in consideration of desired power output characteristics of the fuel cell thus obtainable, or the like.

Regarding the method for producing a fuel cell, conventionally known findings in the field of fuel cells can be referred to as appropriate, without any particular limitations.

Furthermore, a fuel cell stack having a structure in which a plurality of electrolyte membrane-electrode assemblies are connected in series by lamination, with separators being interposed therebetween, may also be formed so that the fuel cell can exhibit a desired voltage. The shape of the fuel cell or the like is not particularly limited and may be determined as appropriate, so that battery characteristics such as desired voltage are obtained.

The PEFC or electrolyte membrane-electrode assembly mentioned above uses a catalyst layer having excellent power generation performance. Furthermore, the PEFC or electrolyte membrane-electrode assembly uses a catalyst layer having excellent power generation performance and durability. Therefore, the PEFC or electrolyte membrane-electrode assembly has excellent power generation performance (or power generation performance and durability).

The PEFC of the present embodiment or a fuel cell stack using this PEFC can be mounted in, for example, a vehicle as a driving power source.

EXAMPLES

The effects of the present invention will be explained using the following Examples and Comparative Examples. However, the technical scope of the present invention is not intended to be limited only to the following Examples. In the Examples described below, unless particularly stated otherwise, the operation was carried out at room temperature (25° C.). Furthermore, unless particularly stated otherwise, "percent (%)" and "part" mean "percent (%) by weight" and "part by weight", respectively.

Example 1

First, nickel(II) sulfamate tetrahydrate was dissolved in ultrapure water, and an aqueous solution of nickel (1) having a concentration of 0.0645 M was produced.

Separately, 0.78 g of trisodium citrate dihydrate and 0.26 g of sodium borohydride were added to 100 mL of ultrapure water, the mixture was mixed, and an aqueous solution of reducing agent (1) was produced.

2 g of a carbon carrier (KETJENBLACK (registered trademark) KetjenBlack EC300J, average particle size: 40 nm, BET specific surface area: 800 m$^2$/g, manufactured by Lion Corp.) was added to 500 mL of a 0.5 M HNO$_3$ solution contained in a beaker, and the mixture was stirred and mixed with a stirrer for 30 minutes at room temperature (25° C.) at 300 rpm. Subsequently, the mixture was subjected to a heat treatment for 2 hours at 80° C. while being stirred at 300 rpm, and a carbon carrier was obtained. The carbon carrier was filtered and then was washed with ultrapure water. The operations of filtration and washing were repeated three times in total. This carbon carrier was dried for 24 hours at 60° C., and then acid-treated carbon carrier A was obtained. The amount of at least one or more functional groups selected from the group consisting of a lactone group, a hydroxyl group, an ether group, and a carbonyl group formed on the surface of the acid-treated carbon carrier A thus obtained, was 1.25 μmol/m$^2$, the BET specific surface area was 850 m$^2$/g, and the average particle size was 40 nm.

0.2 g of acid-treated carbon carrier A was added to 100 ml of ultrapure water contained in a beaker, the mixture was subjected to an ultrasonic treatment for 15 minutes, and a carrier dispersion liquid (1) was obtained. In regard to the following description, the carrier dispersion liquid (1) was continuously stirred at room temperature (25° C.) and at 150 rpm until the carrier dispersion liquid was mixed with the aqueous solution of nickel (1).

17.1 mL of the aqueous solution of nickel (1) and the carrier dispersion liquid (1) were mixed into 1,000 mL of ultrapure water, and then the aqueous solution of reducing agent (1) was added thereto. The resulting mixture was stirred for 30 minutes at 300 rpm with a magnetic stirrer at 35° C., and thereby a dispersion liquid of a catalyst precursor including nickel particles and a carrier (precursor dispersion liquid (1)) was produced. At this time, the molar ratio of sodium borohydride as a reducing agent with respect to nickel (in terms of metal) is 6.2. Furthermore, the molar ratio of trisodium citrate dihydrate as an adsorbent with respect to nickel (in terms of metal) is 2.4.

Next, 0.22 mL of an aqueous solution of chloroplatinic acid (platinic(IV) acid hexachloride (H$_2$PtCl$_6$)) at a concentration of 0.51 M was added to the precursor dispersion liquid (1), and while a magnetic stirrer was rotated at 300 rpm at 35° C., the mixture was stirred with an ultrasonic homogenizer for 30 minutes. Thereby, a dispersion liquid including catalyst particles having platinum protrusions formed on the surface of nickel particles, and a carrier (catalyst particle-containing dispersion liquid (1)) was produced. Here, the catalyst particles thus obtained are referred to as catalyst particles (1). The molar ratio of nickel with respect to platinum (in terms of metal, respectively) in the catalyst particles (1) obtained as described above is 9.8.

An observation of the catalyst particles (1) obtained as described above was made by transmission electron microscopy (TEM). As a result, it was observed that each catalyst particle had a main body that constituted a granular form; and a plurality of protrusions protruding outward from the outer surface of the main body. The particle size (particle diameter) of the catalyst particles, the diameter of the main body, and the diameter and length of the protrusions were measured, and the results are presented in the following Table 1. Furthermore, the aspect ratio (diameter/length) of the protrusions was calculated based on the diameter and length the protrusions, and the results are presented together in the following Table 1. In the following Table 1, the particle size (particle diameter) of the catalyst particles, the diameter of the main body, and the diameter and length of the protrusions in the catalyst particles were measured for all of the catalyst particles observed within a TEM photograph having a size of 200 nm×300 nm, and the maximum values and minimum values thereof are respectively presented as ranges including the values (hereinafter, the same).

The compositions of the main body and the protrusions of the catalyst particles (1) obtained as described above were measured by TEM-EDX. As a result, it was confirmed that the main body was configured to include a central part formed from a non-platinum metal (nickel) at a proportion of 60 mol % or more with respect to the total molar amount; and an outer shell part formed from a non-platinum metal and platinum, the outer shell part being formed on the periphery of the central part, and that the protrusions were formed from platinum at a proportion of 60 mol % or more with respect to the total molar amount.

Furthermore, the catalyst particle-containing dispersion liquid (1) produced as described above was stirred with an ultrasonic homogenizer for 30 minutes at room temperature (25° C.) and then was stirred for 72 hours at 300 rpm using a magnetic stirrer. Thereby, the catalyst particles were supported on the carrier. Subsequently, the catalyst particle-supported carrier was filtered and washed three times with ultrapure water, and then the catalyst particle-supported carrier was dried for 4 hours or longer at 60° C. in air. Thus, an electrode catalyst (1) was produced. The supporting concentration (amount of supporting) of the catalyst particles of the electrode catalyst (1) was 12.6% by weight (Pt: 11.8% by weight and Ni: 0.8% by weight) with respect to the carrier.

Example 2

First, nickel (II) sulfamate tetrahydrate was dissolved in ultrapure water, and an aqueous solution of nickel (2) having a concentration of 0.041 M was produced.

Separately, 1.2 g of trisodium citrate dihydrate and 0.5 g of sodium borohydride were added to 100 mL of ultrapure water, and the mixture was mixed. Thus, an aqueous solution of reducing agent (2) was produced.

Acid-treated carbon carrier A was obtained in the same manner as in Example 1. 0.2 g of the acid-treated carbon carrier A produced as described above was mixed into 100 mL of ultrapure water, and a carrier dispersion liquid (2) was produced. In regard to the following description, the carrier dispersion liquid (2) was continuously stirred at room temperature (25° C.) at 150 rpm until the carrier dispersion liquid (2) was mixed with the aqueous solution of nickel (2).

40.8 mL of the aqueous solution of nickel (2) and the carrier dispersion liquid (2) were mixed into 1,000 mL of ultrapure water, and then the aqueous solution of reducing agent (2) was added thereto. While a magnetic stirrer was rotated at 300 rpm at room temperature (25° C.), the mixture was stirred for 30 minutes with an ultrasonic homogenizer. Thereby, a dispersion liquid of a catalyst precursor including nickel particles and a carrier (precursor dispersion liquid (2)) was produced. At this time, the molar ratio of sodium borohydride as a reducing agent with respect to nickel (in terms of metal) is 7.9. Furthermore, the molar ratio of trisodium citrate dihydrate as an adsorbent with respect to nickel (in terms of metal) is 2.4.

Next, 0.34 mL of an aqueous solution of chloroplatinic acid (platinic(IV) acid hexachloride ($H_2PtCl_6$)) at a concentration of 0.51 M was added to the precursor dispersion liquid (2), and the mixture was stirred for 30 minutes at 400 rpm with a magnetic stirrer at room temperature (25° C.). Thereby, a dispersion liquid including catalyst particles having platinum protrusions formed on the surface of nickel particles, and a carrier (catalyst particle-containing dispersion liquid (2)) was produced. Here, the catalyst particles thus obtained are referred to as catalyst particles (2). The molar ratio of nickel with respect to platinum (in terms of metal, respectively) in the catalyst particles (2) obtained as described above is 9.6.

An observation of the catalyst particles (2) obtained as described above was made by transmission electron microscopy (TEM). As a result, it was observed that each catalyst particle had a main body that constituted a granular form; and a plurality of protrusions protruding outward from the outer surface of the main body. Furthermore, the particle size (particle diameter) of the catalyst particles, the diameter of the main body, and the diameter and length of the protrusions were measured, and the results are presented in the following Table 1. Furthermore, the aspect ratio (diameter/length) of the protrusions was calculated based on the diameter and length of the protrusions, and the results are presented together in the following Table 1.

Furthermore, the compositions of the main body and the protrusions of the catalyst particles (2) obtained as described above were measured by TEM-EDX. As a result, it was confirmed that the main body was configured to include a central part formed from a non-platinum metal (nickel) at a proportion of 60 mol % or more with respect to the total molar amount; and an outer shell part formed from a non-platinum metal and platinum, the outer shell part being formed on the periphery of the central part, and that the protrusions were formed from platinum at a proportion of 60 mol % or more with respect to the total molar amount.

Furthermore, the catalyst particle-containing dispersion liquid (2) produced as described above was stirred for 60 minutes with an ultrasonic homogenizer at room temperature (25° C.) and then was stirred for 48 hours with a magnetic stirrer at 300 rpm. Thereby, the catalyst particles were supported on the carrier. Subsequently, the catalyst particle-supported carrier was filtered and washed three times with ultrapure water, and then the catalyst particle-supported carrier was dried for 4 hours or longer at 60° C. in air. Thus, an electrode catalyst (2) was produced. The supporting concentration (amount of supporting) of the catalyst particles in the electrode catalyst (2) was 18.0% by weight (Pt: 17.0% by weight and Ni: 1.0% by weight) with respect to the carrier.

Example 3

First, nickel(II) sulfate ($NiSO_4$) was dissolved in ultrapure water, and an aqueous solution of nickel (3) having a concentration of 0.0645 M was produced.

Separately, 1.57 g of trisodium citrate dihydrate and 0.52 g of sodium borohydride were added to 100 mL of ultrapure water, and the mixture was mixed. Thus, an aqueous solution of reducing agent (3) was produced.

Acid-treated carbon carrier A was obtained in the same manner as in Example 1 described above. 0.2 g of the acid-treated carbon carrier A produced as described above was mixed into 100 mL of ultrapure water, and a carrier dispersion liquid (3) was produced. In regard to the following description, the carrier dispersion liquid (3) was continuously stirred at room temperature (25° C.) at 150 rpm until the carrier dispersion liquid (3) was mixed with the catalyst particle-containing dispersion liquid (3).

34.2 mL of the aqueous solution of nickel(3) was mixed into 1,000 mL of ultrapure water, and then the aqueous solution of reducing agent (3) was added thereto. While a magnetic stirrer was rotated at 300 rpm at room temperature (25° C.), the mixture was stirred for 30 minutes with an ultrasonic homogenizer, and thereby a dispersion liquid of nickel particles (3) was produced. At this time, the molar ratio of sodium borohydride as a reducing agent with respect to nickel (in terms of metal) is 6.2. Furthermore, the molar ratio of trisodium citrate dihydrate as an adsorbent with respect to nickel (in terms of metal) is 2.4.

Next, 0.39 mL of an aqueous solution of chloroplatinic acid (platinic(IV) acid hexachloride ($H_2PtCl_6$)) at a concentration of 1.16 M was added to the dispersion liquid of nickel particles (3) at 16° C. for 30 minutes, and a dispersion liquid including catalyst particles having platinum protrusions formed on the surface of the nickel particles (catalyst particle-containing dispersion liquid (3)) was produced. Here, the catalyst particles thus obtained are referred to as catalyst particles (3). The molar ratio of nickel with respect to platinum (in terms of metal, respectively) in the catalyst particles (3) obtained as described above is 4.9.

An observation of the catalyst particles (3) obtained as described above was made by transmission electron microscopy (TEM). As a result, it was observed that each catalyst particle had a main body that constituted a granular form; and a plurality of protrusions protruding outward from the outer surface of the main body. Furthermore, the particle size (particle diameter) of the catalyst particles, the diameter of the main body, and the diameter and length of the protrusions were measured, and the results are presented in the following Table 1. Furthermore, the aspect ratio (diameter/length) of the protrusions was calculated based on the diameter and length of the protrusions, and the results are presented together in the following Table 1.

The compositions of the main body and protrusions of the catalyst particles (3) obtained as described above were measured by TEM-EDX. As a result, it was confirmed that the main body was configured to include a central part formed from a non-platinum metal (nickel) at a proportion of 60 mol % or more with respect to the total molar amount; and an outer shell part formed from a non-platinum metal and platinum, the outer shell part being formed on the periphery of the central part, and that the protrusions were formed from platinum at a proportion of 60 mol % or more with respect to the total molar amount.

The carrier dispersion liquid (3) was mixed with the catalyst particle-containing dispersion liquid (3) produced as described above, and the mixture was stirred for 60 minutes with an ultrasonic homogenizer at room temperature (25° C.) and then was stirred for 24 hours at 300 rpm with a magnetic stirrer. Thereby, the catalyst particles were supported on KETJENBLACK. Subsequently, the KETJENBLACK supporting the catalyst particles was filtered and washed three times with ultrapure water, and then the KETJENBLACK was dried for 4 hours or longer at 60° C. in air. Thus, an electrode catalyst (3) was produced. The supporting concentration (amount of supporting) of the catalyst particles in the electrode catalyst (3) was 38.4% by weight (Pt: 35.7% by weight and Ni: 2.7% by weight) with respect to the carrier.

Comparative Example 1

0.2 g of a carbon carrier (KETJENBLACK (registered trademark) KetjenBlack EC300J, average particle size: 40 nm, BET specific surface area: 800 m$^2$/g, manufactured by Lion Corp.) was weighed, and the carbon carrier was introduced into a 200-mL beaker. Ultrapure water was added through the wall surface of the beaker, and the carbon was wetted with water. Next, ultrapure water was added to this beaker until the total amount of water reached 100 mL, and the carbon was dispersed by means of ultrasonic waves. Subsequently, the mixture was stirred with a magnetic stirrer, and a carrier dispersion liquid (4) was obtained.

Separately, 1.2 g of trisodium citrate dihydrate and 0.4 g of sodium borohydride were added to 100 mL of ultrapure water, and the mixture was mixed. Thus, an aqueous solution of reducing agent (4) was produced.

Nickel(II) chloride ($NiCl_2$) was dissolved in ultrapure water, and an aqueous solution of nickel (4) having a concentration of 0.105 M was produced.

Furthermore, chloroplatinic acid (platinic(IV) acid hexachloride ($H_2PtCl_6$)) was dissolved in ultrapure water, and an aqueous solution of chloroplatinic acid (4) having a concentration of 1.16 M was produced.

In a beaker containing 1,000 mL of ultrapure water, 11.174 g of the aqueous solution of nickel (4) and 0.6 g of the aqueous solution of chloroplatinic acid (4) were mixed, and then the aqueous solution of reducing agent (4) was added thereto. The mixture was stirred for 30 minutes at room temperature (25° C.), and thereby a catalyst particle dispersion liquid (4) was produced. The carrier dispersion liquid (4) was mixed into this catalyst particle dispersion liquid (4), and the mixture was stirred for 60 hours at room temperature (25° C.). Thus the catalyst particles were supported on the carrier. Subsequently, the catalyst particle-supported carrier was filtered and washed three times with ultrapure water, and then the catalyst particle-supported carrier was dried for 4 hours or longer at 60° C. in air. Thus, an electrode catalyst (4) having an average particle size (particle diameter) of 4.0 nm was produced. The supporting concentration (amount of supporting) of the catalyst particles in the electrode catalyst (4) was 34.3% by weight (Pt: 29.6% by weight and Ni: 4.7% by weight) with respect to the carrier.

Comparative Example 2

2 g of a carbon carrier (KETJENBLACK (registered trademark) KetjenBlack EC300J, average particle size: 40 nm, BET specific surface area: 800 m$^2$/g, manufactured by Lion Corp.) was added to 500 mL of a 0.5 M $HNO_3$ solution contained in a beaker, and the mixture was stirred and mixed with a stirrer at 300 rpm for 30 minutes at room temperature (25° C.). Subsequently, the mixture was subjected to a heat treatment for 2 hours at 80° C. while being stirred at 300 rpm, and a carbon carrier was obtained. The carbon carrier was filtered and then was washed with ultrapure water. The operations of filtration and washing were repeated three times in total. This carbon carrier was dried for 24 hours at 60° C., and then acid-treated carbon carrier A was obtained. The amount of at least one or more functional groups selected from the group consisting of a lactone group, a hydroxyl group, an ether group, and a carbonyl group formed on the surface of the acid-treated carbon carrier A thus obtained was 1.25 μmol/m$^2$, the BET specific surface area was 850 m$^2$/g, and the average particle size was 40 nm.

0.2 g of the acid-treated carbon carrier A was added to 100 ml of ultrapure water contained in a beaker, and the mixture was subjected to an ultrasonic treatment for 15 minutes. Thus, a carrier dispersion liquid (5) was obtained. In regard to the following description, the carrier dispersion liquid (5) was continuously stirred at 150 rpm at room temperature (25° C.) until the carrier dispersion liquid (5) was mixed with the catalyst particle dispersion liquid (5).

Separately, 1.2 g of trisodium citrate dihydrate and 0.4 g of sodium borohydride were added into 100 mL of ultrapure water, and the mixture was mixed. Thus, an aqueous solution of reducing agent (5) was produced.

Cobalt(II) chloride ($CoCl_2$) was dissolved in ultrapure water, and an aqueous solution of cobalt (5) having a concentration of 0.105 M was produced.

Furthermore, chloroplatinic acid (platinic(IV) acid hexachloride ($H_2PtCl_6$)) was dissolved in ultrapure water, and an aqueous solution of chloroplatinic acid (5) having a concentration of 1.16 M was produced.

22.348 g of the aqueous cobalt solution (5) and 0.6 g of the aqueous solution of chloroplatinic acid (5) were mixed in a beaker containing 1,000 mL of ultrapure water, and the mixture was stirred at 300 rpm at room temperature (25° C.). Subsequently, the aqueous solution of reducing agent (5) was added thereto, and the mixture was stirred for 30 minutes at room temperature (25° C.). Thus, a catalyst particle dispersion liquid (5) was produced. The carrier dispersion liquid (5) was mixed into this catalyst particle dispersion liquid (5), and the mixture was stirred for 72 hours at room temperature (25° C.). Thereby, the catalyst particles were supported on the carrier. Subsequently, the catalyst particle-supported carrier was filtered and washed three times with ultrapure water, and then the catalyst particle-supported carrier was dried for 12 hours or longer at 60° C. in air. Thus, an electrode catalyst (5) having an average particle size (particle diameter) of 2.7 nm was produced. The supporting concentration (amount of supporting) of the catalyst particles in the electrode catalyst (5) was 34.1% by weight (Pt: 29.6% by weight and Co: 4.5% by weight) with respect to the carrier.

Comparative Example 3

An electrode catalyst (6) was obtained by using Ketjenblack (KETJENBLACK (registered trademark) KetjenBlack EC300J, average particle size: 40 nm, BET specific surface area: 800 m$^2$/g, manufactured by Lion Corp.) as a carrier, and supporting platinum (Pt) having an average particle size of 1.8 nm as a catalytic metal on this carrier such that the support ratio would be 50% by weight. That is, 46 g of a carrier (KETJENBLACK) was immersed in 1,000 g of a solution of dinitrodiammine platinum nitric acid solution having a platinum concentration of 4.6% by weight (platinum content: 46 g), the mixture was stirred, and then 100 ml of 100% ethanol was added thereto as a reducing agent. This solution was stirred and mixed for 7 hours at the boiling point, and platinum was supported on the carrier. Then, the solution was filtered and dried, and thereby a catalyst powder having a support ratio of 50% by weight was obtained. Subsequently, the catalyst powder was maintained for 1 hour at a temperature of 900° C. in a hydrogen atmosphere, and thus an electrode catalyst (6) having an average particle size (particle diameter) of 4.5 nm was obtained. The supporting concentration (amount of supporting) of the catalyst particles in the electrode catalyst (6) was 50% by weight (Pt) with respect to the carrier.

For the electrode catalysts (1) to (6) described above, the effective catalyst surface area (ECA), the area specific activity ($i_a$), and the mass specific activity ($i_m$) were evaluated according to the methods described below. The results are presented in the following Table 1.

(Evaluation of Performance of Catalyst)

<Measurement of Effective Catalyst Surface Area (ECA)>

A three-electrode type electrochemical cell was used, and an electrochemical system HZ-5000 manufactured by Hokuto Denko Corp. was used as a potentiostat. As a working electrode, an electrode obtained using a glass carbon rotating electrode (GC-RDE) by coating the rotating electrode with an ink produced by dispersing each of the various electrode catalysts in a dispersing medium (a mixed solvent of 6 ml of isopropyl alcohol (IPA) and 19 ml of water) at a concentration at which the amount of carbon in the ink was 10 mg, and drying the ink, was used. The electrode area was 0.196 cm². A platinum wire was used as a counter electrode, and a reversible hydrogen electrode was used as a reference electrode. Regarding the liquid electrolyte, 0.1 M perchloric acid was used and was saturated with $O_2$. Measurement was carried out at 25° C.

Calculation of the effective catalyst surface area (ECA) was performed by cyclic voltammetry (CV). Before performing the measurement, a 20-cycle scan of potential was performed over a potential range of 0 to 1.2 V at a potential sweep rate of 500 mV/s (catalyst surface cleaning treatment). Subsequently, three cycles were measured at a potential sweep rate of 50 mV/s over a potential range of 0 to 1.2 V. The data of the third cycle at this time was used, and the effective catalyst surface area (ECA) was calculated using an amount of electricity for hydrogen adsorption of 210 μC/cm².

<Measurement of Area Specific Activity ($i_a$) and Mass Specific Activity ($i_a$)>

Various electrode catalysts were uniformly dispersed and supported, together with Nafion, on a rotating disc electrode (geometrical area: 0.19 cm²) formed from a glass carbon disc having a diameter of 5 mm so as to obtain 34 μg·cm⁻², and thus electrodes for performance evaluation were produced.

For the various electrodes, the reversible hydrogen electrode (RHE) was subjected to cyclic voltammetry at a scan rate of 50 mVs⁻¹ over a potential range of 0.05 to 1.2 V in 0.1 M perchloric acid at 25° C., the perchloric acid being saturated with $N_2$ gas. The electrochemical surface area (cm²) of each of the electrode catalysts was calculated from the area of the hydrogen adsorption peak shown at 0.05 to 0.4 V of the voltammogram thus obtained.

Next, a scan of potential was performed in 0.1 M perchloric acid at 25° C. saturated with oxygen, from 0.2 V to 1.2 V at a rate of 10 mV/s, using an electrochemical measuring device. Furthermore, the influence of mass transfer (oxygen diffusion) was corrected using the Koutecky-Levich formula from the current obtained by the scan of potential, and then the current value at 0.9 V was extracted. A value obtained by dividing the current value thus obtained by the electrochemical surface area mentioned above, was designated as area specific activity (μAcm⁻²). Furthermore, a value obtained by dividing the current value thus obtained by the amount of platinum (g) in the supporting catalyst was designated as mass specific activity ($i_m$) ($A \cdot g^{-1}_{Pt}$). The method of using the Koutecky-Levich formula is described in, for example, Electrochemistry, Vol. 79, No. 2, p. 116-121 (2011) (hydrodynamic voltammogram (1) oxygen reduction (RRDE)), "4. Analysis of oxygen reduction reaction on Pt/C catalyst". The current value at 0.9 V thus extracted is divided by the electrochemical surface area, and thereby the area specific activity ($i_a$) is calculated.

TABLE 1

| | Particle diameter (nm) | Main body diameter (nm) | Protrusion diameter a (nm) | Protrusion length b (nm) | Aspect ratio (a/b) | Supporting concentration (wt %) | | ECA [m² g⁻¹$_{Pt}$] | $i_a$ [μA · cm⁻²$_{Pt}$] | $i_m$ [A g⁻¹$_{Pt}$] |
|---|---|---|---|---|---|---|---|---|---|---|
| | | | | | | Pt | Ni or Co | | | |
| Example 1 (PtNi) | 20-50 | 10-30 | 2.2-3.5 | 3-8 | 0.28-1.17 | 11.8 | 0.8 | 25.2 | 4533 | 1142 |
| Example 2 (PtNi) | 30-40 | 20-30 | 1.8-3.4 | 3-8 | 0.22-1.14 | 17.0 | 1.0 | 20.9 | 2756 | 576 |
| Example 3 (PtNi) | 10-30 | 6-15 | 2.5-4.0 | 2-6 | 0.41-2.0 | 35.7 | 2.7 | 26.6 | 2706 | 720 |
| Comparative Example 1 (PtNi) | 4 | — | — | — | 0 | 29.6 | 4.7 | 20.9 | 2253 | 470 |
| Comparative Example 2 (PtCo) | 2.7 | — | — | — | 0 | 29.6 | 4.5 | 38.3 | 2306 | 883 |
| Comparative Example 3 (Pt) | 4.5 | — | — | — | 0 | 50 | 0 | 37.7 | 556 | 210 |

From Table 1 shown above, it can be seen that the catalyst particles of Examples 1 to 3 all have high area specific activity and mass specific activity compared to the catalyst particles of Comparative Example 1, which have an almost same composition and a granular shape. Meanwhile, the mass specific activity of the catalyst particles of Example 2 is slightly low; however, it is speculated that this is because the measured value of ECA was low because a portion of the catalyst particles had aggregated.

REFERENCE SIGNS LIST

1 Polymer electrolyte fuel cell (PEFC)
2 Solid polymer electrolyte membrane
3 Catalyst layer
3a Anode catalyst layer
3c Cathode catalyst layer
4a Anode gas diffusion layer 4c Cathode gas diffusion layer
5a Anode separator
5c Cathode separator
6a Anode gas flow channel
6c Cathode gas flow channel
7 Coolant flow channel
10 Electrolyte membrane-electrode assembly (MEA)
20 Catalyst particles
21 Main body
22 Protrusion

The invention claimed is:

1. A method for producing catalyst particles, the catalyst particles being alloy particles comprising platinum atoms and non-platinum metal atoms, each alloy particle comprising
a main body comprising a granular form; and
a plurality of protrusions protruding outward from an outer surface of the main body, wherein
the main body comprises non-platinum metal and platinum, and the protrusions comprise platinum as a main component,
an aspect ratio (diameter/length) of the protrusions is higher than 0 and lower than or equal to 2,
the main body has a central part formed from the non-platinum metal as a main component, and
the main body is formed from the non-platinum metal at a proportion of at least 60 mol % with respect to a total molar amount of the main body, and the protrusions are formed from platinum at a proportion of 60 to 100 mol % with respect to a total molar amount of the protrusions, the method comprising:
preparing a non-platinum metal precursor solution including a non-platinum metal precursor;
preparing a reducing agent mixed liquid including an adsorbent and a reducing agent;
mixing the non-platinum metal precursor solution with the reducing agent mixed liquid, reducing the non-platinum metal precursor, and thereby obtaining a non-platinum metal particle dispersion liquid;
preparing a platinum precursor solution including a platinum precursor; and
mixing the non-platinum metal particle dispersion liquid with the platinum precursor solution, reducing the platinum precursor, and thereby growing platinum on a non-platinum metal particle surface to form protrusions,
wherein in the step of mixing the non-platinum metal precursor solution with the reducing agent mixed liquid, an amount of addition of the adsorbent in the reducing agent mixed liquid is 2.3 mol or more with respect to 1 mol (in terms of metal) of the non-platinum metal precursor.

2. The method according to claim 1, wherein a diameter of the alloy particles is more than 0 nm and less than or equal to 100 nm.

3. The method according to claim 1, wherein the protrusions have a diameter of more than 0 nm and less than or equal to 4 nm, and a length of more than 0 nm and less than or equal to 10 nm.

4. The method according to claim 1, wherein the non-platinum metal atoms are transition metal atoms.

5. The method according to claim 4, wherein the transition metal atoms are selected from the group consisting of vanadium (V), chromium (Cr), manganese (Mn), iron (Fe), cobalt (Co), nickel (Ni), copper (Cu), or zinc (Zn).

6. The method according to claim 1, wherein an amount of the non-platinum metal atoms is 0.3 mol or less with respect to 1 mol of the platinum atoms.

7. The method according to claim 1, wherein an amount of the non-platinum metal atoms is 0.1 to 0.3 mol with respect to 1 mol of the platinum atoms.

8. The method according to claim 1, wherein an amount of the non-platinum metal atoms is 0.15 to 0.3 mol with respect to 1 mol of the platinum atoms.

9. The method according to claim 1, wherein the central part is formed from the non-platinum metal at a proportion of 60 mol % or more and 100 mol % or less with respect to a total molar amount of the central part, and an outer shell part that covers the central part is formed from a non-platinum metal and platinum.

10. The method according to claim 1, wherein the central part is composed substantially of non-platinum metal.

11. The method according to claim 1, wherein a diameter of the catalyst particle is more than 6 nm and less than or equal to 60 nm.

12. A method for producing catalyst particles, the method comprising:
preparing a non-platinum metal precursor solution including a non-platinum metal precursor;
preparing a reducing agent mixed liquid including an adsorbent and a reducing agent;
mixing the non-platinum metal precursor solution with the reducing agent mixed liquid, reducing the non-platinum metal precursor, and thereby obtaining a non-platinum metal particle dispersion liquid;
preparing a platinum precursor solution including a platinum precursor; and
mixing the non-platinum metal particle dispersion liquid with the platinum precursor solution, reducing the platinum precursor, and thereby growing platinum on a non-platinum metal particle surface to form protrusions,
wherein in the step of mixing the non-platinum metal precursor solution with the reducing agent mixed liquid, an amount of addition of the adsorbent in the reducing agent mixed liquid is 2.3 mol or more with respect to 1 mol (in terms of metal) of the non-platinum metal precursor.

* * * * *